(12) United States Patent
Sakaue

(10) Patent No.: US 8,184,344 B2
(45) Date of Patent: May 22, 2012

(54) IMAGE PROCESSING APPARATUS AND IMAGE PROCESSING METHOD, COMPUTER PROGRAM AND STORAGE MEDIUM

(75) Inventor: Tsutomu Sakaue, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1128 days.

(21) Appl. No.: 12/033,953

(22) Filed: Feb. 20, 2008

(65) Prior Publication Data

US 2008/0316510 A1 Dec. 25, 2008

(30) Foreign Application Priority Data

Jun. 25, 2007 (JP) ................. 2007-166960

(51) Int. Cl.
*H04N 1/40* (2006.01)
(52) U.S. Cl. ....... 358/3.28; 358/1.9; 358/1.18; 358/474; 382/100; 382/112; 382/162; 382/274
(58) Field of Classification Search .................. None
See application file for complete search history.

(56) References Cited

U.S. PATENT DOCUMENTS

| | | | | |
|---|---|---|---|---|
| 5,563,955 A | * | 10/1996 | Bass et al. ............. | 382/101 |
| 6,128,401 A | * | 10/2000 | Suzuki et al. .......... | 382/135 |
| 6,484,865 B1 | * | 11/2002 | Hibari et al. .......... | 194/330 |
| 6,580,820 B1 | * | 6/2003 | Fan .................. | 382/135 |
| 2002/0037096 A1 | * | 3/2002 | Sugata ............... | 382/136 |
| 2002/0080994 A1 | * | 6/2002 | Lofgren et al. ........ | 382/100 |
| 2006/0115110 A1 | * | 6/2006 | Rodriguez et al. ...... | 382/100 |
| 2007/0091055 A1 | * | 4/2007 | Sakuda ............... | 345/102 |

FOREIGN PATENT DOCUMENTS

JP 2004-102562 4/2004

* cited by examiner

*Primary Examiner* — Dov Popovici
*Assistant Examiner* — Miya J Cato
(74) *Attorney, Agent, or Firm* — Fitzpatrick, Cella, Harper & Scinto

(57) ABSTRACT

The present invention provides an image processing apparatus, an image processing method, computer-program, and storage medium capable of acquiring a paper fingerprint efficiently and improving convenience for users. An image processing apparatus according to the present invention includes an image sensor acquiring RGB signals. The G signal is separated from the acquired RGB signals, and the RGB signals are input into a gain adjustment 1+A/D-converting 1 section and the separated G signal is input into a gain adjustment 2+A/D-converting 2 section. The gain adjustment 2+A/D-converting 2 section performs gain adjustment on the input G signal on a different basis from the gain adjustment 1+A/D-converting 1 section. The gain-adjusted G signal is input into a paper fingerprint extracting section via a shading correcting section. The paper fingerprint extracting section extracts a paper fingerprint based on the input G signal.

15 Claims, 19 Drawing Sheets

# IMAGE PROCESSING APPARATUS AND IMAGE PROCESSING METHOD, COMPUTER PROGRAM AND STORAGE MEDIUM

BACKGROUND OF THE INVENTION

1. Field of the Invention

The present invention relates to an image processing apparatus, and an image processing method, computer program and storage medium, which can treat paper fingerprint information.

2. Description of the Related Art

Recently, with the wide spread use of multi-functional image processing apparatuses capable of copying, the importance of security therewith has been increasingly noticed. The multi-functional image processing apparatus, while being convenient, might invite leaks of confidential information or illegal document falsification depending on its usage. Accordingly, multi-functional copying machines are provided with an anti-counterfeiting device or a copy guard function. Also, techniques for discriminating characteristics of paper itself and ensuring uniqueness or originality of a document based on the paper discrimination have been developed (refer to Japanese Patent Laid-Open No. 2004-102562).

When the technique disclosed in Japanese Patent Laid-Open No. 2004-102562 is used, however, there is a problem that a fabric pattern specific to paper (paper fingerprint) can not be discriminated without a special reading apparatus. To solve this problem, reading devices of widely used multi-function copying machines might be utilized for reading out the paper fingerprint. However, for reading out the paper fingerprint specific to paper properly, it is necessary to do so by reducing light intensity (or gain) to a level where a background color of the paper can be read out. At this time, if a copying process is done at the same time with the paper fingerprint extraction in this condition, an image to be copied will be output overlapped with the background color. This is caused because the background color of the paper is reproduced by the copying process in the reduced read-out level.

For solving this problem, there may be devised a method in which the reading is performed twice by changing light intensity (or gain). That is, for acquiring the paper fingerprint, it is necessary to carry out another scanning by changing light intensity (or gain) separately from a reading operation (scanning) for the copying.

A technique utilizing a paper fingerprint is an important technique for ensuring originality of a document, but there still remain problems to be overcome for acquiring the paper fingerprint efficiently. For example, conventionally, it is necessary to carry out scanning twice for acquiring the paper fingerprint as described above and it is desired to improve productivity of the scanning.

Also, there is a desire to acquire the useful paper fingerprint as described above, even in a scanner with a configuration in which the same document can not be read twice, as in the case where it is skimmed.

SUMMARY OF THE INVENTION

The present invention provides an image processing apparatus, and an image processing method, computer program, and storage medium, which can acquire a paper fingerprint efficiently and improve convenience for users.

According to a first aspect of the present invention, there is provided an image processing apparatus comprising: means for acquiring multiple color signals according to a document obtained by scanning; first gain adjustment means for performing gain adjustment on said multiple color signals; second gain adjustment means for performing gain adjustment, different from the gain adjustment on said multiple color signals, on at least one color signal and not all said multiple color signals; and extraction means for extracting paper fingerprint information of said document using a color signal on which is performed gain adjustment by said second gain adjustment means.

According to a second aspect of the present invention, there is provided an image processing apparatus comprising: means for acquiring multiple color signals according to a document obtained by scanning; storage means for storing at least one color signal out of said multiple color signals; means for calculating coordinates of a predetermined area in a document image of said multiple color signals based on the multiple color signals; means for extracting a signal regarding an area corresponding to said predetermined area from said at least one color signal stored in said storage means based on said calculated coordinates; and means for acquiring paper fingerprint information of said document based on said extracted signal.

According to a third aspect of the present invention, there is provided an image processing method comprising: a step of acquiring multiple color signals according to a document obtained by scanning; a first gain adjustment step of performing gain adjustment on said multiple color signals; a second gain adjustment step of performing gain adjustment, different from the gain adjustment on said multiple color signals, on at least one color signal and not all said multiple color signals; and a step of extracting paper fingerprint information of said document using a color signal on which is performed gain adjustment on by said second gain adjustment step.

According to a fourth aspect of the present invention, there is provided an image processing method comprising the steps of: acquiring multiple color signals according to a document obtained by scanning; storing at least one color signal out of said multiple color signals into a storage means; calculating coordinates of a predetermined area in a document image of said multiple color signals based on the multiple color signals; extracting a signal regarding an area corresponding to said predetermined area from said at least one color signal stored in said storage means based on said calculated coordinates; and acquiring paper fingerprint information of said document based on said extracted signal.

According to the present invention, among multiple color signals acquired in a single scanning, at least one color signal is acquired separately from the multiple color signals, and gain adjustment is performed on the separately acquired signal on a basis different from that on the multiple color signals. Thereby, it is possible to realize acquiring an image and a paper fingerprint in a single scanning, resulting in acquiring a paper fingerprint efficiently. Also, even in an image reading apparatus (e.g. scanner or the like) with a configuration in which the same document can not be read twice, as in the case where it is skimmed, it is possible to acquire an image and a paper fingerprint in a single scanning, thus improving convenience for users.

Also, according to the present invention, the separately acquired signal is stored once, a predetermined position is calculated from the multiple color signals, and only a signal of the predetermined position can be extracted from among the stored signal based on the calculated position. Accordingly, it is possible to use only a signal amount necessary for acquiring a paper fingerprint, and thereby reducing required hardware and improving convenience for users.

Further features of the present invention will become apparent from the following description of exemplary embodiments (with reference to the attached drawings).

DESCRIPTION OF THE EMBODIMENTS

Figure 1:
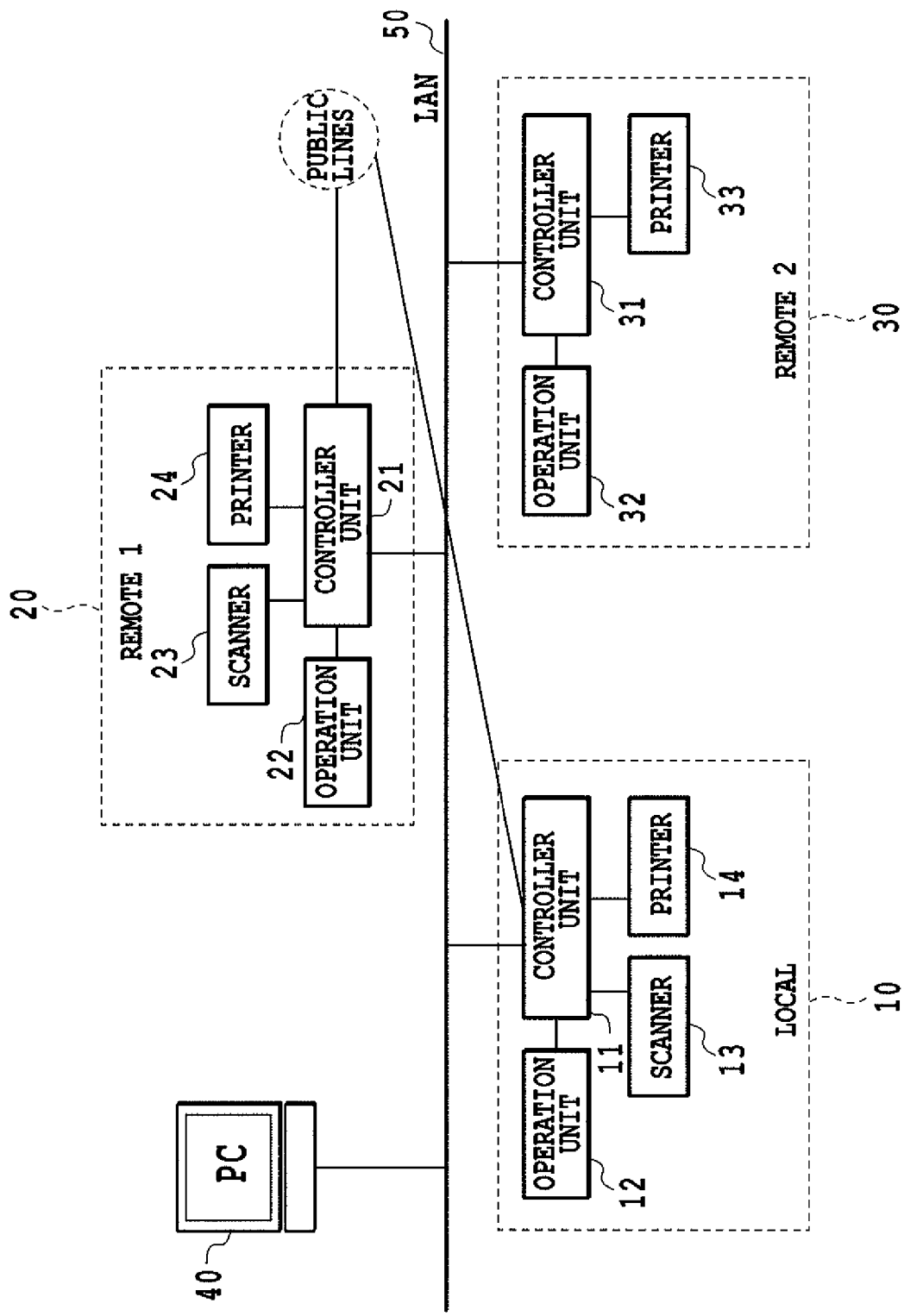
FIG. 1 is a diagram illustrating a whole configuration of an image forming system according to an embodiment of the present invention.

Hereinafter, embodiments of the present invention will be described in detail with reference to the drawings. Note that, in the drawings illustrating hereinafter, components with the same function are designated by the same symbol and repeated description will be omitted.

(First Embodiment)
<Printing System>

FIG. 1 is a block diagram illustrating a configuration of a printing system according to the present embodiment. Although a host computer 40 and three image forming apparatuses (10, 20 and 30) are connected to a LAN 50 in this system, the number of apparatuses in a printing system according to the present invention is not limited to these numbers. Also, although the present embodiment uses a LAN for a connection method, a connection method for the present invention is not limited to this connection method. For example, any network such as a WAN (public line), a serial transmission method such as a USB, a parallel transmission method such as Centronics or SCSI, or the like may also be applied.

The host computer (hereinafter, referred to as PC) 40 has a function of a personal computer. This PC 40 can transmit and receive files or e-mails using a FTP or a SMB protocol via the LAN 50 or a WAN. The PC 40 can also issue a print command to the image forming apparatuses 10, 20, and 30 via a printer driver.

The image forming apparatuses 10 and 20 have the same configuration, and they are MFPs (Multi-Functional Printer), for example. The image forming apparatus 30 has only a printing function and does not include a scanner unit which is included in the image forming apparatuses 10 and 20. Hereinafter, for simplicity of description, the image forming apparatus 10 is focused on, of the image forming apparatuses 10 and 20, and the configuration thereof will be described in detail.

The image forming apparatus 10 includes a scanner unit 13, which is an image input device, and a printer unit 14, which is an image output device. Also, the image forming apparatus 10 includes a controller unit 11, which controls operations of the whole image forming apparatus 10, and an operation unit 12, which serves as a user interface (UI).

<Image Forming Apparatus 10>

Figure 2:
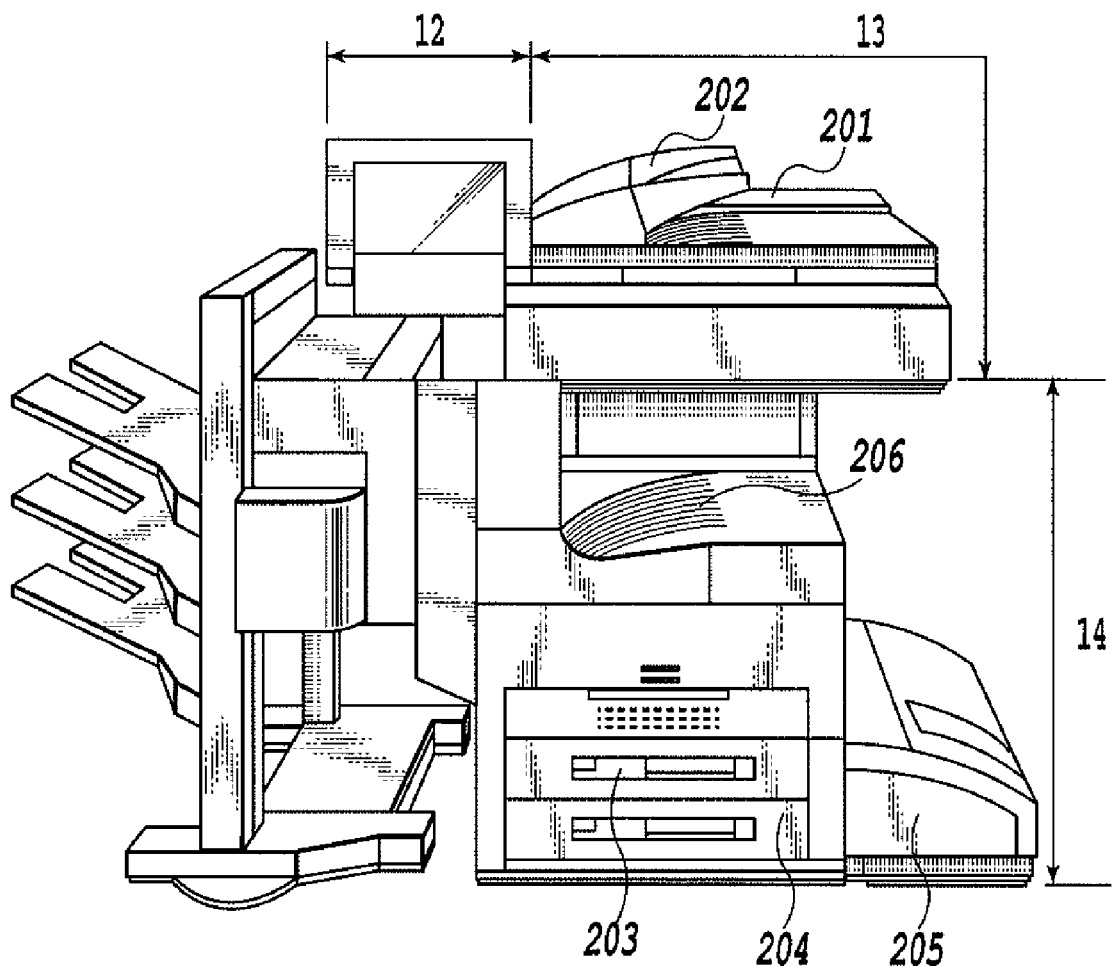
FIG. 2 is an appearance diagram of an input/output device of an image forming apparatus according to an embodiment of the present invention.

FIG. 2 shows an external appearance of the image forming apparatus 10. The scanner unit 13 has a plurality of CCDs. If sensitivities of the CCDs differ from one another, each pixel will be discriminated as having a different density even if the density of each pixel on a document is the same. For this reason, in the scanner unit 13, a white sheet (a uniformly white sheet) is exposed and scanned first, and then an amount of the reflected light obtained by an exposure and scan is converted into an electrical signal, which is output to the controller unit 11.

Here, as described below, a shading correcting section 500 in the controller unit 11 recognizes differences among the sensitivities of CCDs on the basis of the electric signal acquired from each CCD. Then, by utilizing these recognized differences in the sensitivities, the shading correcting section 500 corrects values of an electrical signal acquired by scanning an image on a document. Further, on receiving information regarding gain adjustment from the CPU 301 within the controller unit 11 described below, the shading correcting section 500 performs gain adjustment according to this information. The gain adjustment is used to determine how the values of the electrical signal acquired by exposing and scanning the document are allocated to luminance signal values of 0 to 255. This gain adjustment can convert the value of the electric signal acquired by exposing and scanning the document into a higher luminance signal value or into a lower luminance signal value. Changes of the signals in the above processing will be described with reference to FIG. 10.

Figure 10:
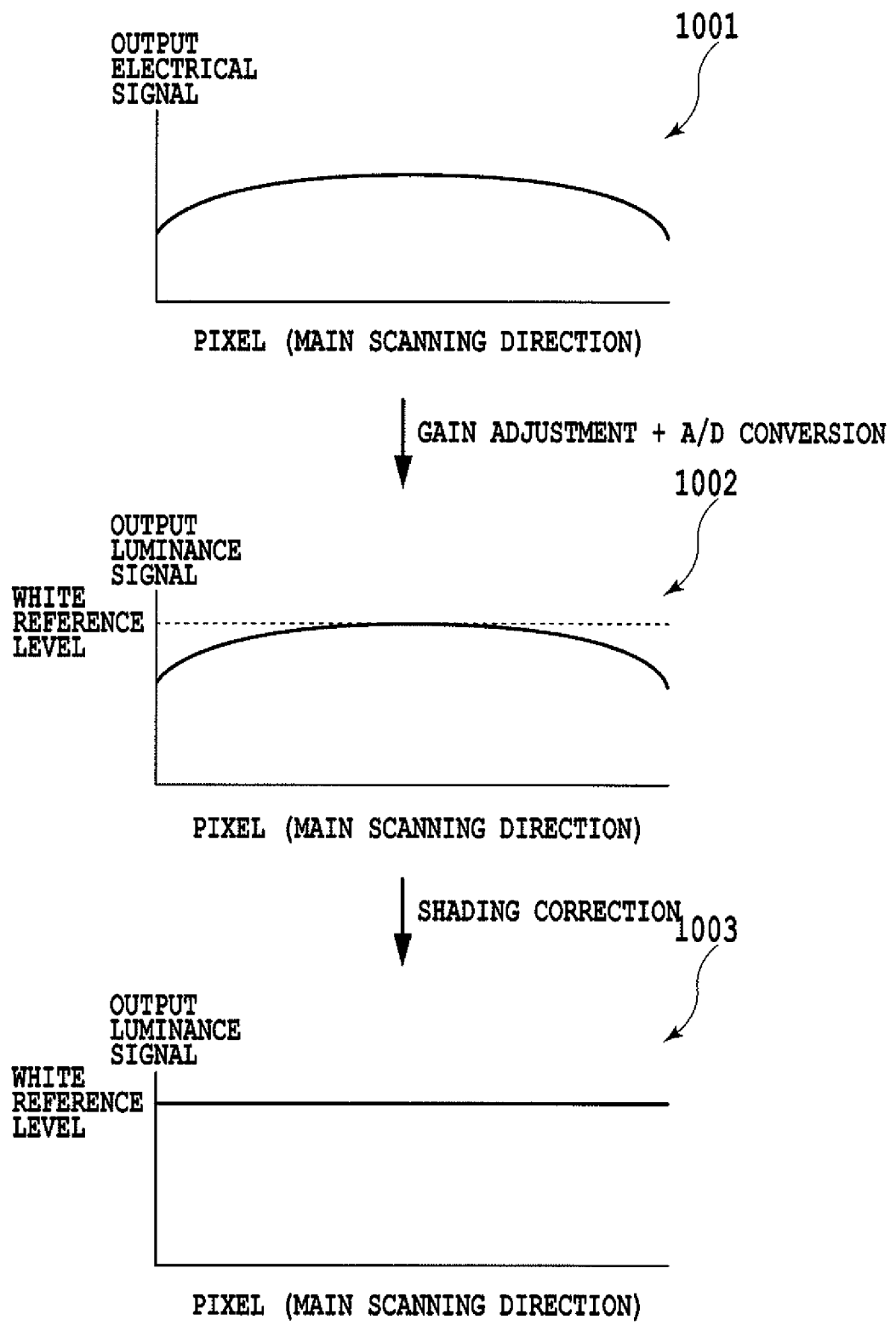
FIG. 10 is an explanatory diagram of a signal correction such as a shading correction according to an embodiment of the present invention.

FIG. 10 is a diagram illustrating a signal correction such as a shading correction according to the present embodiment. A reference numeral 1001 shows a plot of an electrical signal output from the CCD for pixel positions in the main scanning direction when a white sheet is read. In the plot 1001, the output electrical signal shows lower values in a peripheral region than in a central region. This depends on a configuration of a scanner and is only an example for explanation. In the present description, a scanner in which light intensity tends to be lower in a peripheral region is described as an example.

A plot 1002 is a plot of output luminance signal values obtained after the electrical signal values are adjusted by the gain adjustment and A/D converted to be allocated to digital signal values of 0 to 255, when the output electrical signal is converted into a digital signal with 8 bits in A/D conversion. Here, the maximum value (255) of the output luminance signal is determined on the basis of the white reference level of the white sheet.

Next, a configuration for scanning an image on a document will be described. The scanner unit 13 exposes and scans an image on the document and inputs the obtained reflected light to the CCDs, and thereby converts image information into an electric signal. The scanner unit 13 further converts the electric signal into a luminance signal composed of each of the R, G, and B colors and outputs this luminance signal as image data to the controller unit 11. That is, the scanner unit 13 works as an image reader for reading an image formed on a recording medium.

Here, the document is placed on a tray 202 of a document feeder 201. When a user enters a reading start instruction through the operation unit 12, the controller unit 11 gives a document read instruction to the scanner unit 13. On receiving this instruction, the scanner unit 13 feeds sheets of the document on the tray 202 of the document feeder 201, sheet by sheet, and performs a reading operation of the document. To read a document, instead of using automatic feeding performed by the document feeder 201, individual pages of the document may be placed on a glass panel (not shown in the drawing) and scanned by movement of an exposure unit.

The printer unit 14 forms image data received from the controller unit 11 onto a recording medium, that is, the printer unit 14 is an image forming device for forming an image. In the present embodiment, an image forming method is an electrophotographic method using a photosensitive drum or a photosensitive belt. However, the present invention is not limited thereto and can be also applied to, for example, an inkjet system that ejects ink through fine nozzle arrays to print an image on a sheet. Further, the printer unit 14 is provided with a plurality of sheet cassettes 203, 204, and 205 that permit a user to select different sheet sizes or different sheet directions. Printed sheets are discharged to a discharge tray 206.

<Detailed Description of the Controller Unit 11>

Figure 3:
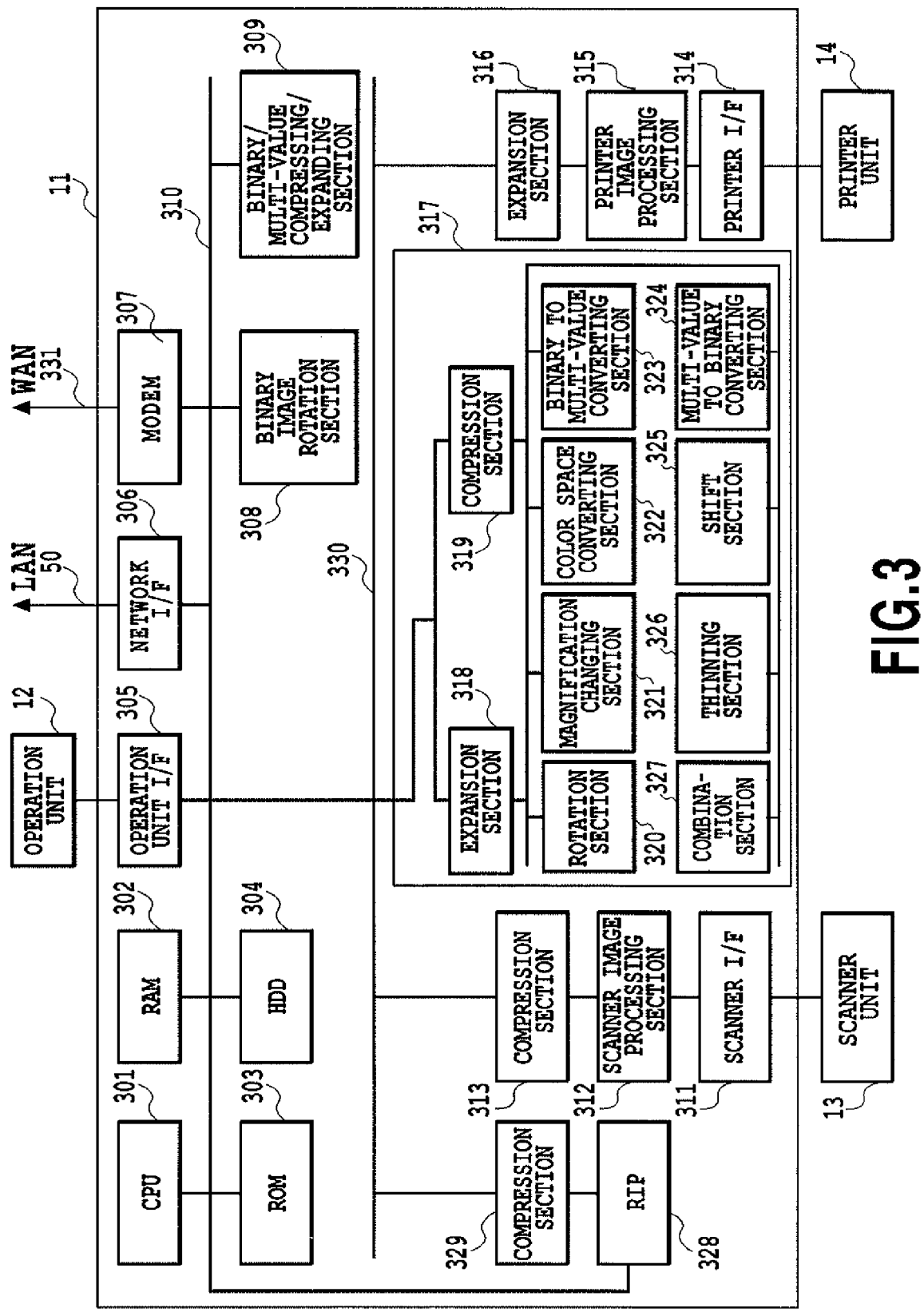
FIG. 3 is a diagram illustrating a whole configuration of the image forming apparatus according to an embodiment of the present invention.

FIG. 3 is a block diagram illustrating in more detail a configuration of the controller unit 11 in the image forming apparatus 10.

The controller unit 11 is electrically connected to the scanner unit 13 and the printer unit 14, and is also connected to the PC 40, an external apparatus, or the like via the LAN 50 and a WAN 331. Thereby, image data and device information can be input and output.

A CPU 301 controls collectively accesses of the various devices that are currently connected using a control program and the like stored in a ROM 303, and also controls collectively various processings that are performed inside the controller unit. A RAM 302 is a system work memory for operating the CPU 301 and also a memory for storing image data temporarily. This RAM 302 may include an SRAM, contents of which are also retained after the power is switched off, and a DRAM, contents of which are erased after the power is switched off. A boot program and the like for the apparatus are stored in the ROM 303. In the present embodiment, the CPU 301 performs processing operations, such as various kinds of calculations, controls, and determinations, according to the control programs for processings and the like associated with this embodiment, the control programs being stored in the ROM 303. An HDD 304, that is, a hard disk drive, can be used to store system software and image data.

An operation unit I/F 305 is an interface section for connecting a system bus 310 to the operation unit 12. This operation unit I/F 305 receives, via the system bus 310, image data to be displayed on the operation unit 12 and outputs the image data to the operation unit 12, and also outputs to the system bus 310 information input from the operation unit 12.

A network I/F 306 is connected to the LAN 50 and the system bus 310 for input and output of information. A modem 307 is connected to the WAN 331 and the system bus 310 for input and output of information. A binary image rotating section 308 converts a direction of the image data to be transmitted. A binary image compressing/expanding unit 309 converts a resolution of image data to be transmitted into a predetermined resolution or a resolution that is compatible with the capability of an opposite apparatus. Here, for data compression or expansion, a method such as JBIG, MMR, MR, or MH is employed. An image bus 330, which is used as a transmission line for exchanging image data, is either a PCI bus or formed in conformity with IEEE 1394 provisions.

A scanner image processing section 312 performs correction, modification, or edition on image data received from the scanner unit 13 via a scanner I/F 311. Here, the scanner image processing section 312 determines whether the received image data is for a color document or a black and white document, or for a character document or a photograph document, and attaches the determination result to the image data. Such associated information is referred to as attribute data. The detail of the processing performed by the scanner image processing section 312 will be described below.

Figure 4:
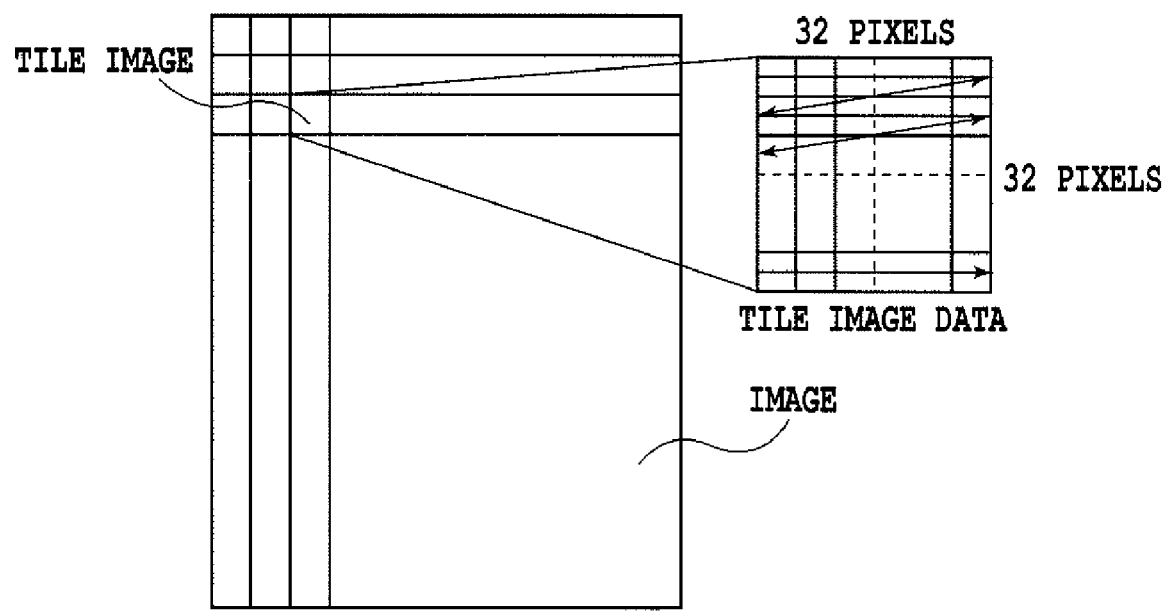
FIG. 4 is a diagram conceptually illustrating tile data according to an embodiment of the present invention.

A compression section 313 receives the image data and divides this image data into blocks of 32 pixels×32 pixels each. Here, the 32×32 pixel image data is referred to as tile data. FIG. 4 is a conceptual diagram showing this tile data. In a document (a sheet medium before scanning), an area corresponding to the tile data is referred to as a tile image. To the tile data, average luminance information for a block of 32×32 pixels and a coordinate position of the tile image on a document are attached as header information. Further the compression section 313 compresses the image data consisting of multiple blocks of tile data. An expansion section 316, after expanding the image data consisting of multiple blocks of tile data, performs raster development for the image data and then transmits the resultant image data to a printer image processing section 315.

The printer image processing section 315 receives the image data sent from the expansion section 316, and performs image processing on the image data with reference to attribute data attached to the image data. The image data acquired through the image processing is then output to the printer unit 14 via a printer I/F 314. The details of the processing performed by this printer image processing section 315 will be described below.

An image converting section 317, which performs a predetermined conversion on the image data, includes the following processing sections.

An expansion section 318 expands received image data. A compression section 319 compresses received image data. A rotation section 320 rotates received image data. A magnification changing section 321 performs a resolution conversion processing (e.g., from 600 dpi to 200 dpi) on received image data. A color space converting section 322 converts a color space of received image data. With use of a matrix or a table, the color space converting section 322 can perform a well-known background color removal processing, a well-known LOG conversion processing (RGB to CMY), and a well-known output color correction processing (CMY to CMYK). A binary to multi-value converting section 323 converts received binary tone image data into 256 tone image data, while a multi-value to binary converting section 324 converts received 256 tone image data into binary tone image data using a method such as an error diffusion process.

A combination section 327 combines two sets of received image data to generate one set of image data. For combining two sets of image data, there is a method in which an average value of luminance levels of pixels to be combined is regarded as a combined luminance value, or a method in which a greater luminance value for pixels to be combined is regarded as a luminance level of a combined pixel. Moreover, there is also a method in which a smaller luminance value for pixels to be combined is regarded as a luminance level after combination, or a method in which a luminance level employed after combination is determined through the logical sum calculation, the logical product calculation or the exclusive OR calculation of pixels to be combined. These are all well known combining methods. A thinning section 326 then performs a resolution conversion by thinning out pixels of received image data to generate image data, a resolution of which is ½, ¼, ⅛, or the like of the received image data. A shift section 325 adds a margin portion to received data, or deletes a margin portion from received image data.

An RIP 328 receives intermediate data, which is generated on the basis of PDL code data transmitted from the PC 40 or the like, and generates (multi-valued) bit map data.

<Detailed Description of the Scanner Image Processing Section 312>

Figure 5:
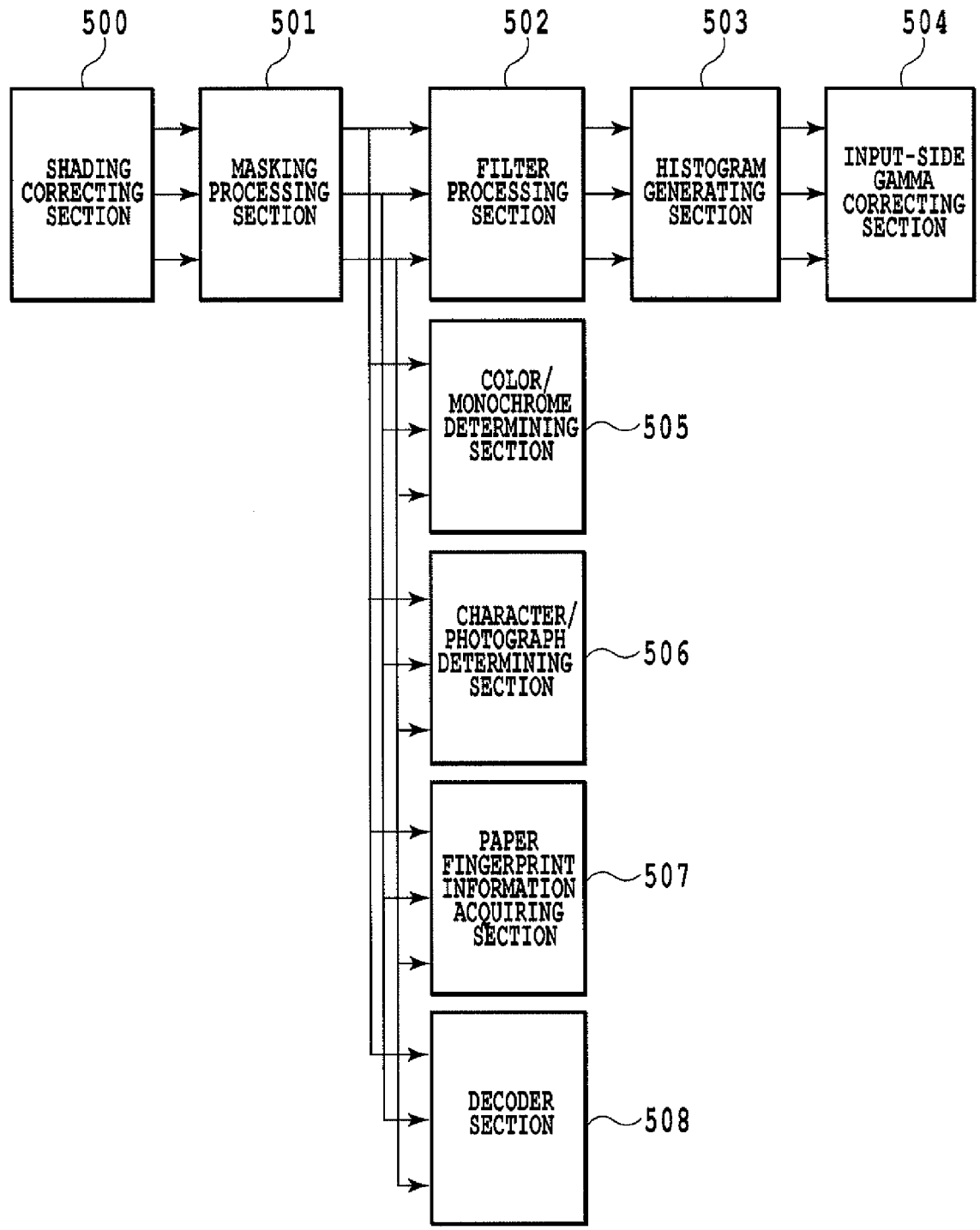
FIG. 5 is a block diagram of a scanner image processing section according to an embodiment of the present invention.

FIG. 5 shows an internal configuration of the scanner image processing section 312.

The scanner image processing section 312 receives image data consisting of RGB luminance signals of 8 bits each. The shading correcting section 500 performs a shading correction on these luminance signals. The shading correction is a process for preventing a brightness of a document from being misrecognized due to a variation in sensitivities of CCDs, as described above. Also, as described above, the shading correcting section 500 can perform gain adjustment by an instruction from the CPU 301.

FIG. 10 illustrates an effect of the shading correction. A luminance signal, after the gain adjustment and the A/D conversion, is adjusted by the shading correction such that all the pixels in the main scanning direction have the same signal level. FIG. 10 shows an example in which the signal levels are adjusted to meet the white reference level. Thereby, the scanning variation associated with the sensitivity of the CCD or the configuration of the scanner is corrected as shown in a plot 1003. Here, the plot 1003 is a plot of output luminance signal levels obtained by the shading correction performed on the output luminance signal after the gain adjustment and the A/D conversion.

Subsequently, these luminance signals are converted by a masking processing section 501 into standard luminance signals that do not depend on the filter color of the CCDS.

A filter processing section 502 corrects a spatial frequency of received image data in any way. The filter processing section 502 performs a computation on the received image data using a matrix of 7×7, for example. By the way, in a copying machine or a multi-functional apparatus, a user can select a character mode, a photograph mode, or a character/photograph mode as a copy mode by pressing a tab 704 in FIG. 7. Here, when the character mode is selected by the user, the filter processing section 502 applies character filtering to the entire image data. Also, when the photograph mode is selected, the filter processing section 502 applies photograph filtering to the entire image data. Further, when the character/photograph mode is selected, the filter processing section 502 adaptively switch filters for each pixel according to a character/photograph determination signal described below (a part of the attribute data), that is, it is determined whether photograph filtering or character filtering should be applied for each pixel.

Note that, for a photograph filter, a coefficient such as performing smoothing only for a high frequency component is used. This is done to prevent roughness of an image from being conspicuous. Also, a coefficient such as performing increased edge enhancement is set for a character filter. This is done better to express sharpness of a character.

A histogram generating section 503 samples luminance data of individual pixels constituting received image data. More specifically, the histogram generating section 503 samples, at constant pitches in the main scanning direction and the sub-scanning direction, the luminance data included in a rectangular area that is defined by a starting point and an ending point designated in each of the main scanning direction and the sub-scanning direction. Then, the histogram generating section 503 generates histogram data based on the sampling results. The generated histogram data is used for estimating a level of a background color in a background color removal process. An input-side gamma correcting section 504 converts the image data into a luminance data having nonlinear characteristics by using a table or the like.

A color/monochrome determining section 505 determines whether each pixel constituting received image data represents chromatic color or achromatic color, and attaches the determination result, as a color/monochrome determination signal (a part of the attribute data), to the image data.

A character/photograph determining section 506 determines whether each pixel in image data is a constituent of a character, or of a halftone dot, or of a character in halftone dots, or of a solid image, on the basis of a pixel value of each pixel and pixel values of surrounding pixels thereof. Note that a pixel that does not fit into any of these categories is a pixel constituting a blank area. Then, the character/photograph determining section 506 attaches the determination results, as a character/photograph determination signal (a part of the attribute data), to the image data.

A paper fingerprint information acquiring section 507 acquires image data of a predetermined area in the RGB image data input from the shading correcting section 500.

A decoder section 508 detects encoded image data in the image data output from the masking processing section 501, if it exists, and takes out information by decoding the detected encoded image data.

<Regarding Image Data Processing and Paper Fingerprint Acquiring Processing>

As a characteristic of a paper fingerprint acquisition, to extract a fiber pattern specific to a document paper, it is preferable to be able to read a higher luminance than in normal document reading in order to read correctly unevenness or a fiber texture of the paper in scanning. In the normal document reading, assuming not to reproduce a background color of a paper in a printing process, it is popular to read image data by removing the background color to some extent. This makes characters or images easily viewable.

Meanwhile, it is necessary to read the paper fingerprint remaining a sufficient background color of a paper without removing the background color, in order to read the fiber texture of the paper itself as described above. Reading in this manner, however, generates an output overlapped with the background color in printing processing, resulting in causing a problem of deterioration in image quality.

That is, a luminance for reading a normal image such as a character and an image in a high quality level and a luminance for reading a paper fingerprint in a high quality level are different. Therefore, it is sometimes difficult to acquire a good paper fingerprint by reading the paper fingerprint using a light intensity suitable for reading a normal image. Thereby, conventionally, a normal image and a paper fingerprint have been read separately in suitable conditions, respectively, and this requires a scanning operation twice.

Figure 12:
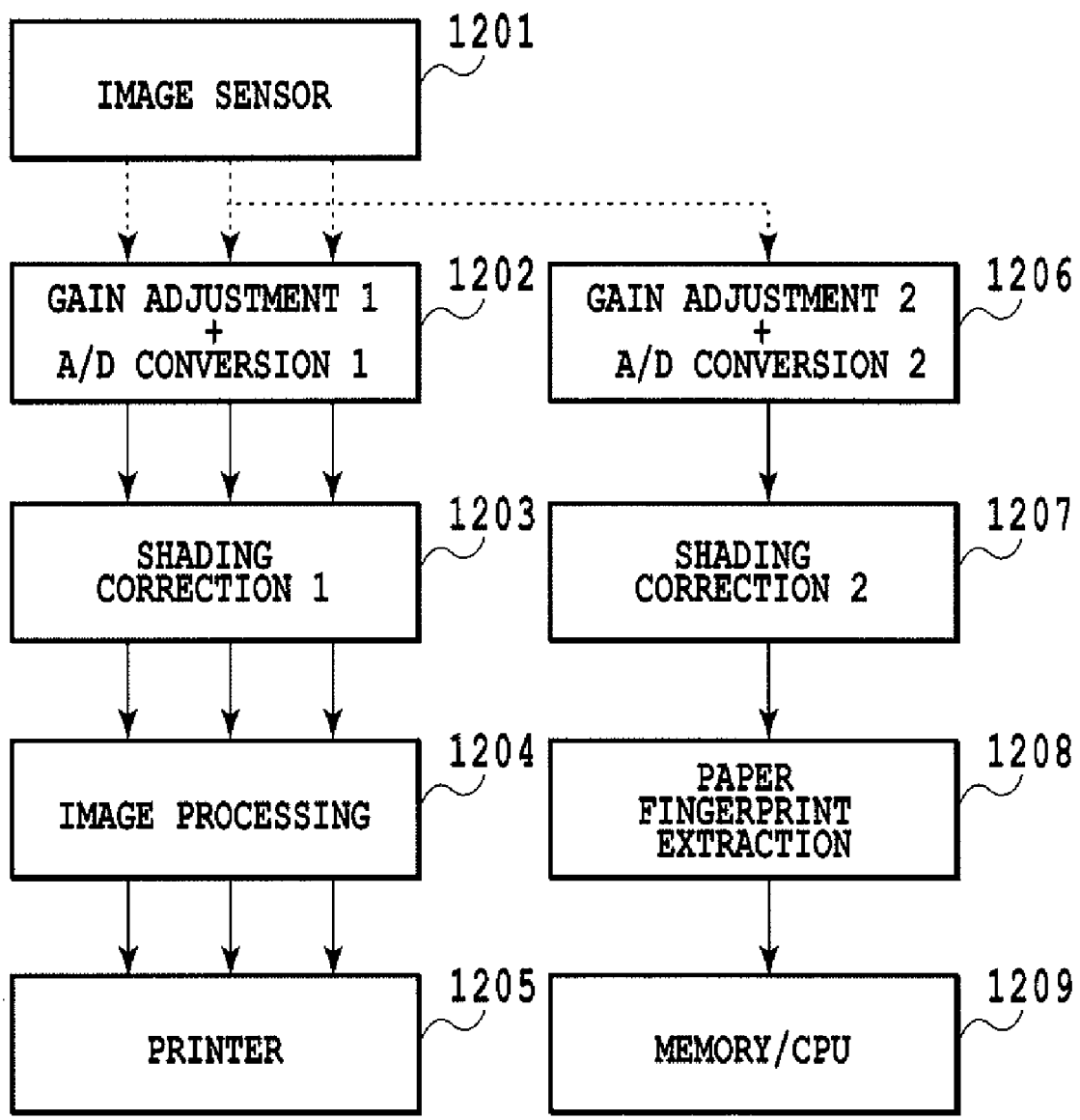
FIG. 12 is an explanatory diagram of a paper fingerprint extracting process according to an embodiment of the present invention.

Accordingly, in view of this problem, the present embodiment realizes reading a paper fingerprint by remaining a sufficient background color of a paper, while reading a normal image in a conventional manner, in a single scanning of a document. With reference to FIG. 12, image data processing and paper fingerprint acquiring processing according to the present embodiment will be described specifically.

Copy processing will be described exemplarily.

First, the image data processing will be described. An image sensor 1201 is an image sensor having three channels of R, G, and B, and acquires multiple color signals (R, G, and B channel signals) by reading a document image. The image is read by the image sensor 1201 and electrical signals of the three cannels, R, G, and B (also called image signal) thereof are input into a gain adjustment 1+A/D-converting 1 section 1202. Also, as described below, the image sensor 1201 outputs a channel signal of one color among the R, G, and B channel signals (here, G channel signal, also called paper fingerprint signal) to a gain adjustment 2+A/D-converting 2 section 1206.

For this purpose, the present embodiment uses a circuit configuration in which the G channel signal (paper fingerprint signal) is duplicated among the R, G, and B channel signals and the duplicated G channel signals are input into the gain adjustment 1+A/D-converting 1 section 1202 and the gain adjustment 2+A/D-converting 2 section 1206, respectively. Here, the G channel signals may be amplified by an amplifier provided in the circuit.

At this time, the electrical signal is an analog signal, the gain adjustment 1+A/D-converting 1 section 1202 performs gain adjustment to realize a background color level required for a normal image processing. Also, at the same time, an image signal with eight bits, for example, is generated. At this time, a white reference value is calculated from a white sheet, and A/D conversion is performed such that the maximum value in the eight bits, 255, becomes the white reference value.

Figure 11:
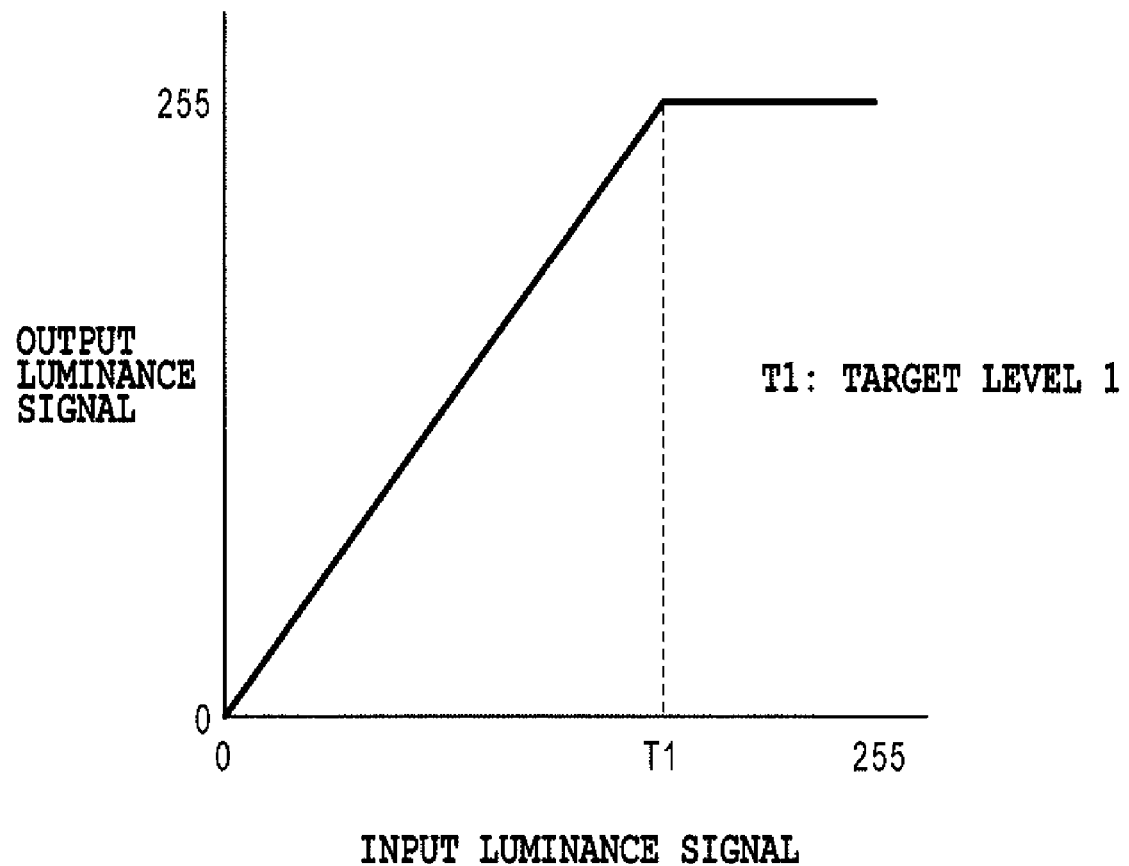
FIG. 11 is an explanatory diagram of a signal correction in gain adjustment according to an embodiment of the present invention.

FIG. 11 is an exemplary diagram illustrating gain adjustment for image data according to the present embodiment. Assuming a white reference value calculated from a white sheet as a target level 1 (T1) in the input luminance signal, a characteristic of the gain adjustment is determined such that this value becomes 255 in the output luminance signal after the A/D conversion.

Next, a shading correcting section 1203 performs a shading correction for the electrical signal output from the gain adjustment 1+A/D-converting 1 section 1202. An image processing section 1204 performs various image processing for the shading-corrected signal. In a case of copy processing, a printer 1205 outputs an image based on a signal regarding the image data output from the image processing section 1204.

Meanwhile, in a case of paper fingerprint processing, among the three channel signals, R, G, and B read by the image sensor 1201, only the G channel signal, for example, is duplicated and input into the gain adjustment 2+A/D-converting 2 section 1206. That is, the gain adjustment 2+A/D-converting 2 section 1206 acquires a channel signal of one color (paper fingerprint signal) among the channel signals of R, G, and B output from the image sensor 1201. Here, the gain adjustment 2+A/D-converting 2 section 1206 performs gain adjustment suitable for paper fingerprint extraction at a target level 2 (T2) separately calculated for the paper fingerprint extraction, not at the target level 1 (T1) calculated from the normal white reference value.

Figure 13:
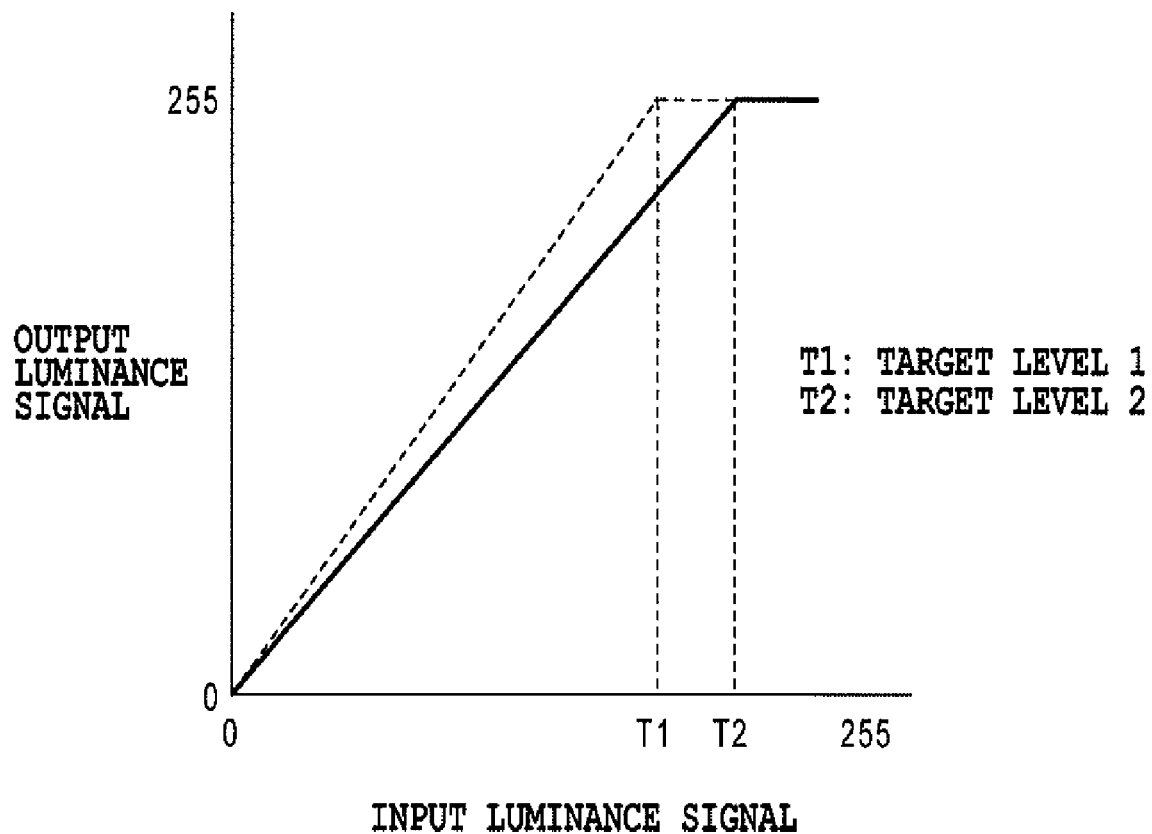
FIG. 13 is an explanatory diagram of a signal correction in gain adjustment according to an embodiment of the present invention.

FIG. 13 is an exemplary diagram illustrating gain adjustment for a paper fingerprint according to the present embodiment. The target level 2 (T2) is higher than the target level 1 (T1) and allows an input luminance signal to represent a whiter image within the output luminance signal. That is, by setting the target level 2 (T2) as a white reference level in reading the paper fingerprint, it is possible to read a fiber pattern specific to a document sheet.

The shading correcting section 1207 performs a shading correction for the paper fingerprint image which is converted to a luminance signal by the gain adjustment 2+A/D-converting 2 section 1206. A paper-fingerprint extraction processing section 1208 extracts the paper fingerprint of the document according to the shading-corrected signal (color signal) regarding the paper fingerprint. The paper fingerprint information regarding the extracted paper fingerprint is stored in or reported to a memory/CPU 1209.

In this manner, in the present embodiment, for the channel signal of a color duplicated for the paper fingerprint extraction, the gain adjustment is performed on the basis different from that of the gain adjustment on the channel signal of each color (image signal) of the image data. This different basis is a gain adjustment value suitable for the paper fingerprint extraction. That is, in the present embodiment, a tonal value of the input signal corresponding to the maximum tonal value of the output signal (target level) for the paper fingerprint signal is made larger than the target level for the image signal.

Since the gain adjustment suitable for the paper fingerprint extraction and also the gain adjustment suitable for the image data processing can be performed in this manner, it is possible to perform the paper fingerprint extraction and also the image data processing using R, G, and B signals, even if only each one of the R, G, and B signals is acquired. That is, it is not necessary to perform scanning for acquiring a paper fingerprint and scanning for acquiring image data by, such as, changing light intensity in the scanning and it is possible to perform reading an image of a document and a paper fingerprint of the document by a single scanning.

An important aspect of the embodiment is that, from multiple color signals (e.g., R, G, and B signal) acquired by a single scanning, one color signal among the multiple color signals is acquired separately from the multiple color signals for performing paper fingerprint extraction and image data processing in the single scanning. Then, for the separately obtained signal (paper fingerprint signal), gain adjustment is performed on a basis different from that for image signals, and thereby it becomes possible to perform acquiring an image of a document and acquiring a paper fingerprint of the document from the same image data.

The present embodiment employs a circuit configuration in which one channel signal (G channel signal) is duplicated among the R, G, and B channel signals output from the image sensor 1201, for acquiring the paper fingerprint signal separately in this manner.

<Detailed Description of the Paper Fingerprint Information Acquiring Section 507>

Figure 8:
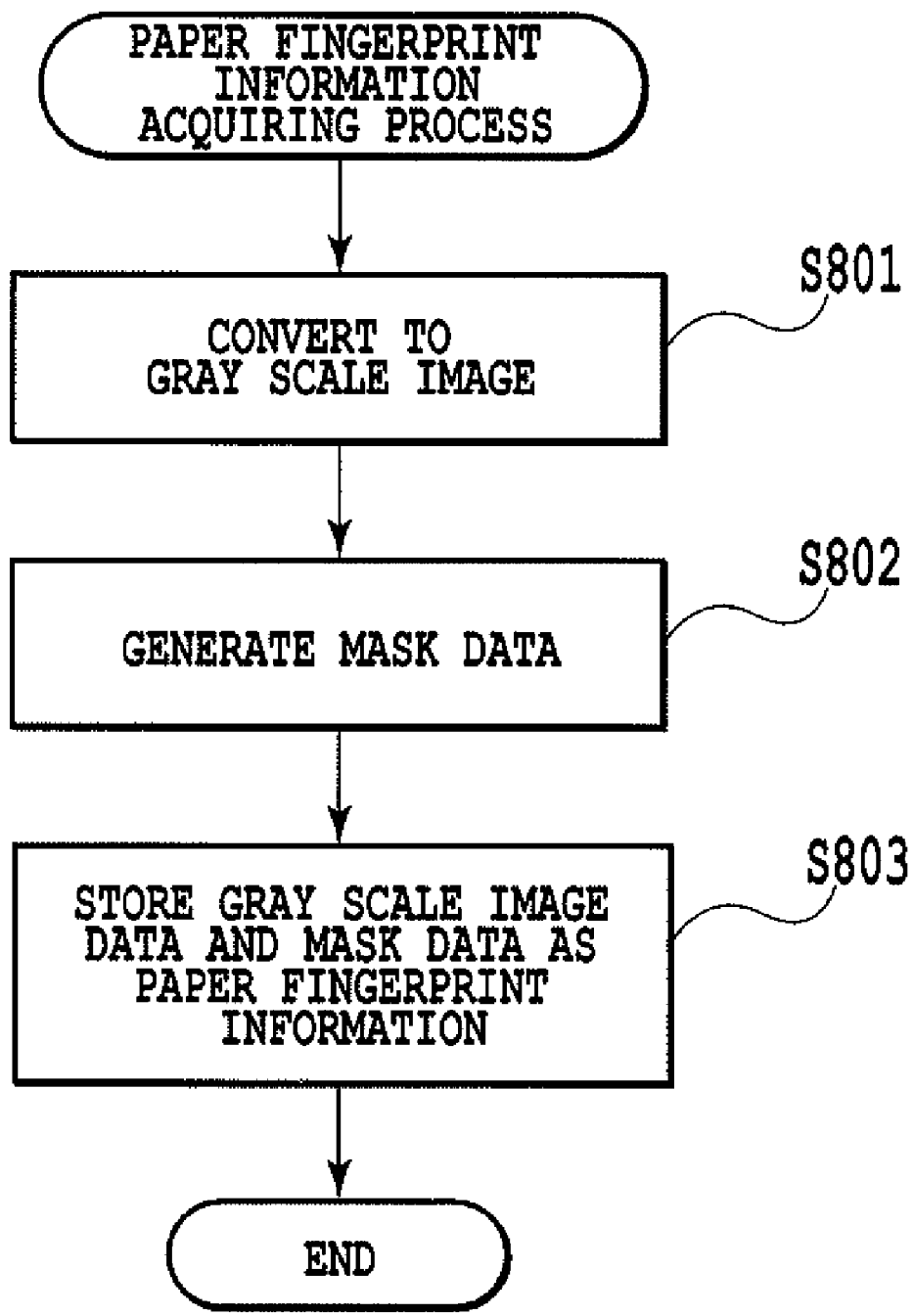
FIG. 8 is a diagram showing a flowchart of a paper fingerprint information acquiring process according to an embodiment of the present invention.

FIG. 8 is a diagram showing a flowchart of a paper fingerprint information acquiring process performed by the paper fingerprint information acquiring section 507.

In Step 801, the paper fingerprint information acquiring section 507 converts the image data regarding the paper fingerprint extracted in a paper fingerprint extracting section 1208 into image data having gray scales.

In Step 802, the paper fingerprint information acquiring section 507 generates a mask data for collation by removing image data which could be a factor causing misrecognition such as printed or hand-written character data in the image data with gray scales obtained in Step 801. The mask data is binary data of "0" or "1". The mask data value is set to "1" for a pixel, a luminance signal value of which is equal to or larger than a first threshold value (i.e., brighter) in the image data with gray scales. Also, for a pixel, a luminance signal value of which is smaller than the first threshold value, the mask data value is set to "0". The above processing is performed for each pixel included in the image data with gray scales.

In Step 803, the paper fingerprint information acquiring section 507 acquires two set of data, the image data with gray scales obtained in Step 801 and the mask data generated in Step 802, as paper fingerprint information.

The paper fingerprint information acquiring section 507 transmits the paper fingerprint information of the predetermined area to the RAM 302 via a data bus (not shown in the drawing).

<Detailed Description of the Printer Image Processing Section 315>

Figure 6:
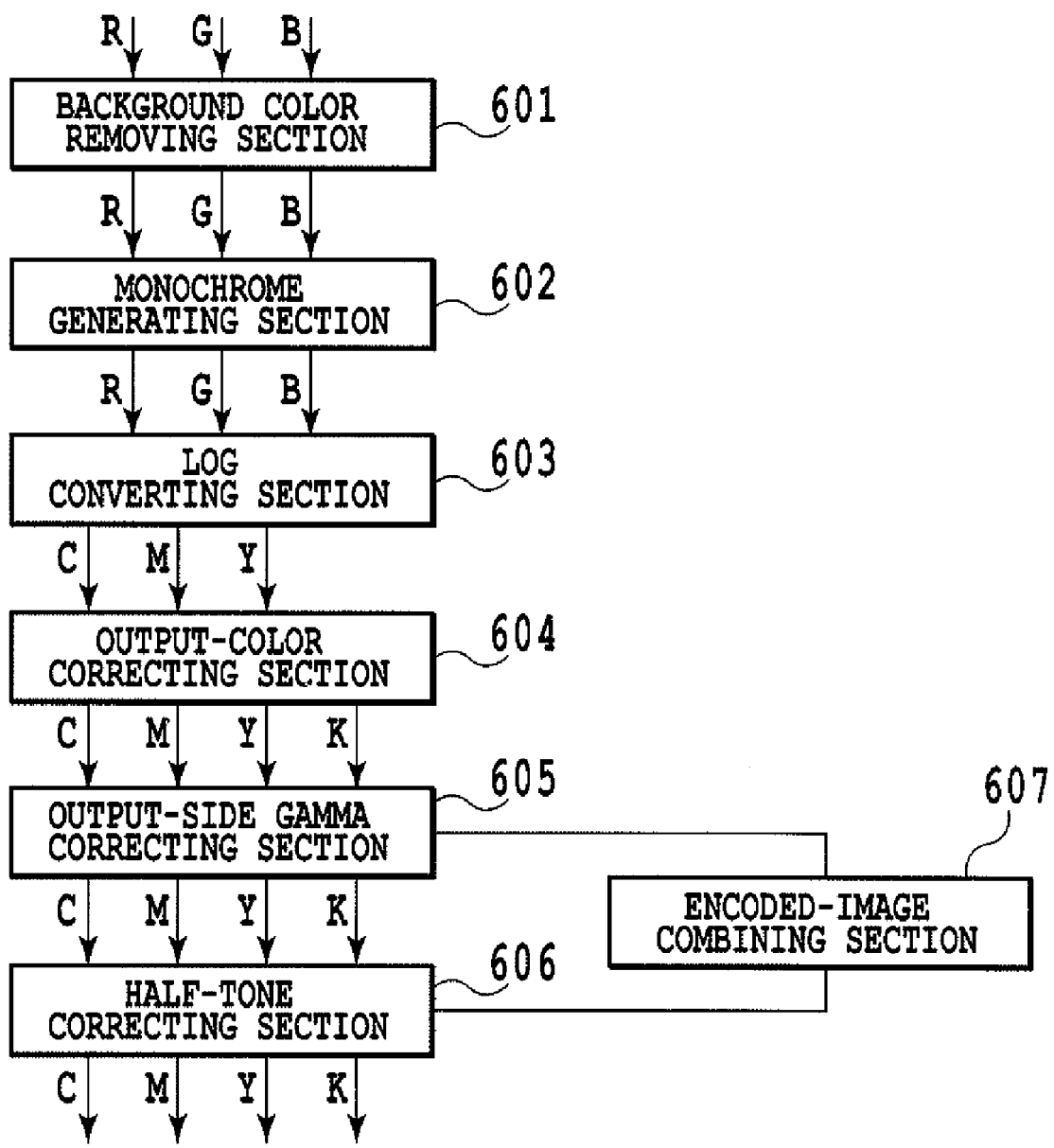
FIG. 6 is a block diagram of a printer image processing section according to an embodiment of the present invention.

FIG. 6 shows a process flow performed in the printer image processing section 315.

A background-color removing section 601 removes a background color of image data using the histogram generated in the scanner image processing section 312. A monochrome generating section 602 converts color data into monochrome data. A Log converting section 603 performs luminance-density conversion, for example, converts input RGB image data into CMY image data.

An output-color correcting section 604 performs output color correction, for example, converts input CMY image data into CMYK image data by using a table or a matrix. An output-side gamma correcting section 605 performs a correction such that a signal value input to this output-side gamma correcting section 605 is proportional to a reflection density value of a copied output. An encoded-image combining section 607 combines (document) image data corrected in the output-side gamma correcting section 605 and encoded image data generated in <paper fingerprint information encoding process> described below. A half-tone correcting section 606 performs a half tone processing according to the number of tones in an output printer unit, for example, performs binarization or quantization to 32-values for received image data with high gradation values.

Note that each processing part provided in the scanner image processing section 312 or the printer image processing section 315 can also output received image data without performing any processing thereon. An event wherein a specific processing part passes data without performing any processing in this way is referred to as "permitting data to pass through a processing section."

<Paper Fingerprint Information Encoding Process>

The CPU 301 can control reading the paper fingerprint information of the predetermined area transmitted to the ROM 302 from the paper fingerprint information acquiring section 507, and performing an encoding processing of the read paper fingerprint information to generate encoded image data.

Here, in the present specification, the encoded image indicates an image such as a two-dimensional code image or a bar-coded image.

Further, the CPU 301 can control transmitting the generated encoded image data to the encoded-image combining section 607 in the printer image processing section 315 via the data bus (not shown in the drawing).

Here, above mentioned controls (control of encoded image generation and control of transmission) are performed by execution of a program stored in the RAM 302.

<Paper Fingerprint Information Collating Process>

The CPU 301 can control reading the paper fingerprint information transmitted from the paper fingerprint information acquiring section 507 to the RAM 302, and collating the read paper fingerprint information with other paper fingerprint information. Here, the other paper fingerprint information means paper fingerprint information included in the encoded image data or paper fingerprint information registered in a sever.

Figure 9:
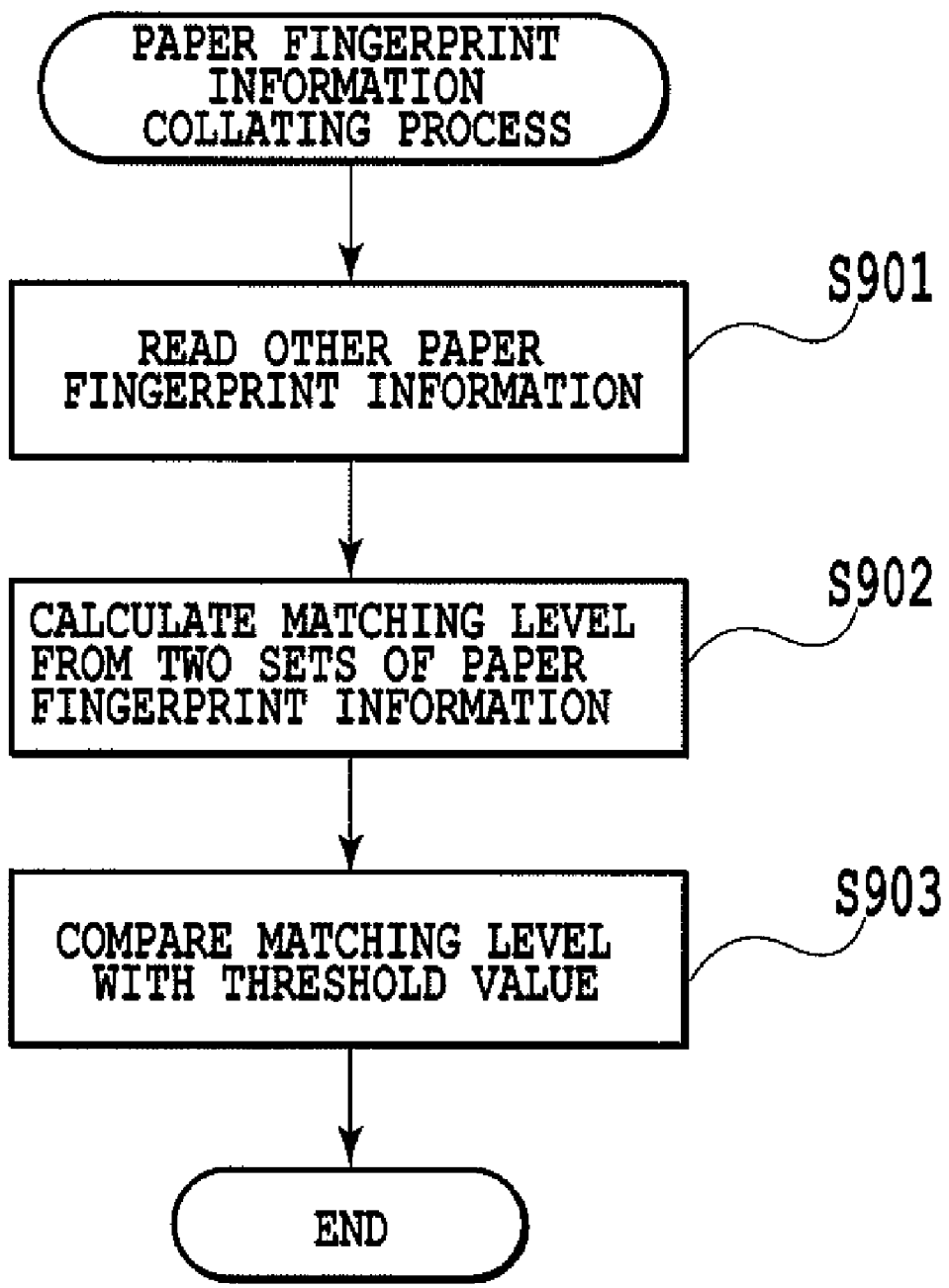
FIG. 9 is a diagram showing a flowchart of a paper fingerprint information collating process according to an embodiment of the present invention.

FIG. 9 is a diagram showing a flowchart of this paper fingerprint information collating process. Each step of this flowchart is collectively controlled by the CPU 301.

In Step 901, the paper fingerprint information included in the encoded image data or the paper fingerprint information registered in the server is taken out of the RAM 302.

In Step 902, a matching level of the two sets of paper fingerprint information is calculated by use of a formula 1 for collating the paper fingerprint information transmitted from the paper fingerprint information acquiring section 507 and the paper fingerprint information taken out in Step 901. One set of the paper fingerprint information is assumed to be shifted from the other set of the paper fingerprint information. Then, in a function shown in the formula 1, an error image (E) between the two sets of the paper fingerprint information is obtained at a condition in which a value calculated by the function of the formula 1 becomes minimum, that is, a difference between the two sets of the paper fingerprint information becomes minimum, by shifting pixel by pixel.

(Formula 1)

$$E = (\alpha_1 f_1^2 \otimes \alpha_2) - 2(\alpha_1 f_1 \otimes \alpha_2 f_2) + (\alpha_1 \otimes \alpha_2 f_2^2) \qquad (1)$$

In the formula (1), $\alpha_1$ is the mask data in the paper fingerprint information taken out in Step 901, and $f_1$ is the image data with gray scales in the paper fingerprint information taken out in Step 901. Also, $\alpha_2$ represents the mask data in the paper fingerprint information transmitted from the paper fingerprint information acquiring section 507 in Step 902, and $f_2$ represents the image data with gray scales in the paper fingerprint information transmitted from the paper fingerprint information acquiring section 507 in Step 902.

The following processing is performed for quantifying numerically a result of the paper fingerprint information collation from the above error image. A luminance signal value of each pixel in the error image obtained by the function of the formula (1) is inverted to be a negative value. Further, the negative values are averaged and difference values between the average value and each of the negative values are obtained. Subsequently, a standard deviation is calculated from the difference values obtained above, and a quotient of the each negative value divided by the standard deviation is obtained. Lastly, the largest value in the obtained quotients is determined to be a matching level of the two sets of the paper fingerprint information. As a result, this matching level of the fingerprint information is represented by a value equal to or larger than zero, and the larger value of this matching level shows the better matching of the two sets of the paper fingerprint information.

In Step 903, "valid" or "invalid" is determined by comparison of the matching level of the two sets of the paper fingerprint information obtained in Step 902 and a predetermined threshold value. Above described is the description of the controller unit 11.

<Description of an Operating Screen>

Figure 7:
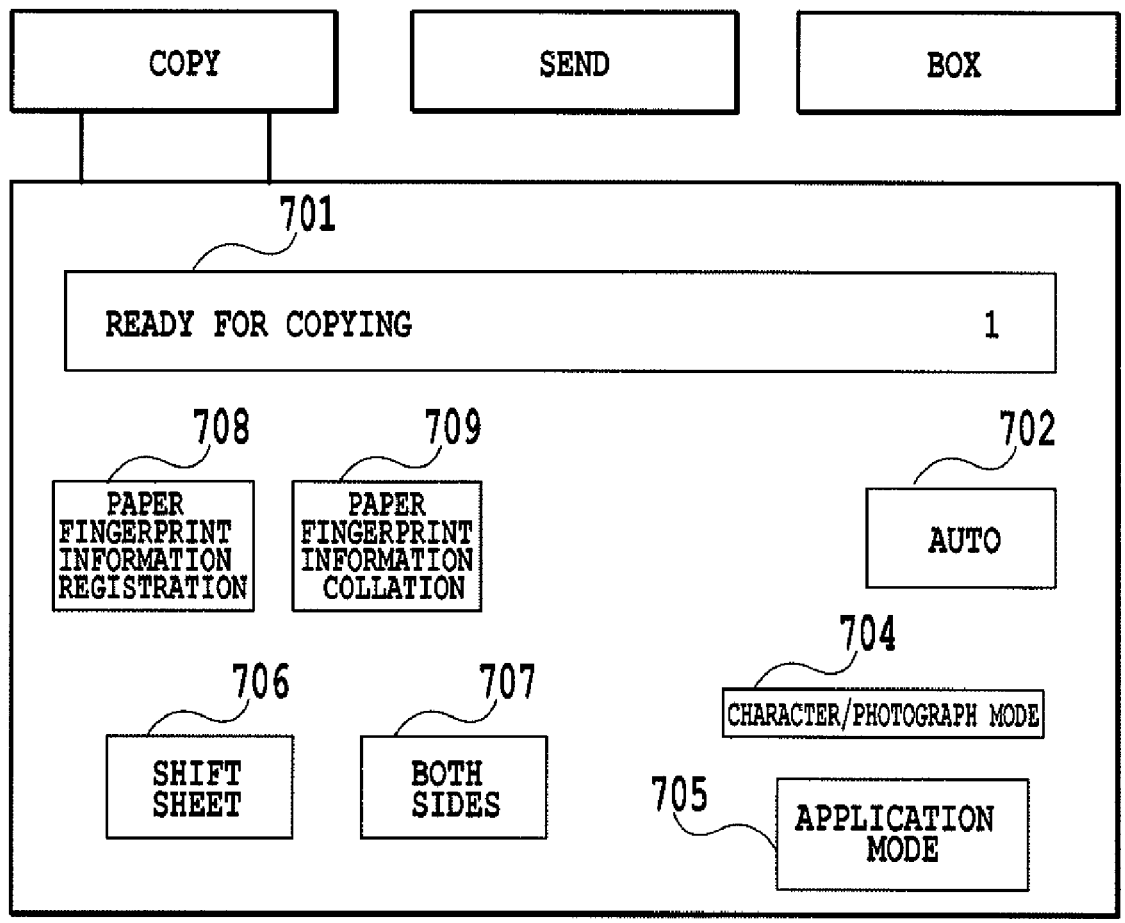
FIG. 7 is an explanatory diagram of a copy screen in an operation unit according to an embodiment of the present invention.

FIG. 7 shows an initial screen in the image forming apparatus 10. A region 701 shows whether the image forming apparatus 10 is ready for copying, and also shows a set number of copies. A document selection tab 704 is a tab for selecting a type of a document, and pressing this tab generates a pop-up display of a menu for three kinds of selections; character, photograph, and character/photograph. A finishing tab 706 is a tab for making a setting regarding various kinds of finishing modes. A double-sided setting tab 707 is a tab for making a setting regarding both-side reading and both-side printing. A read-mode tab 702 is a tab for selecting a mode of reading a document. Pressing this tab generates a pop-up display of a menu for three kinds of selections; color/black/automatic (ACS) Here, if color is selected, color copying is performed, and if black is selected, monochrome copying is performed. Also, if ACS is selected, a copying mode is determined by the color/monochrome determination signal described hereinabove.

A region 708 is a tab for selecting a paper fingerprint information registering process which will be described hereinafter. A region 709 is a tab for selecting the paper fingerprint information collating process. This paper fingerprint information collating process will be also described hereinafter.

<Operation when the Paper Fingerprint Information Registering Process Tab is Pressed>

Next, there will be described the paper fingerprint information registering process which is performed when a start key is pressed after the paper fingerprint information registering tab 708 shown in FIG. 7 is pressed by a user.

Figure 16:
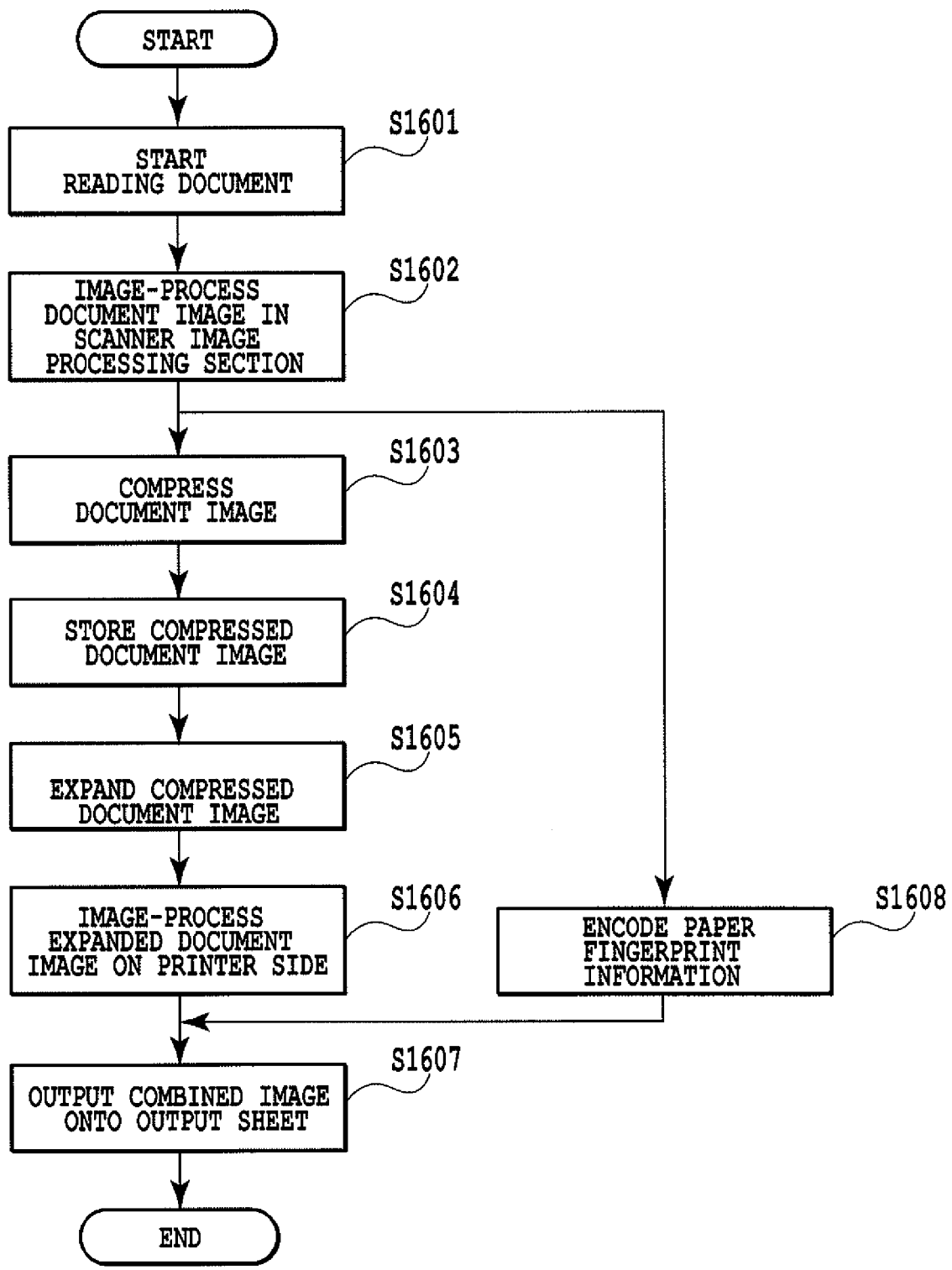
FIG. 16 is a diagram showing a flowchart illustrating a paper fingerprint information registering process according to an embodiment of the present invention.

FIG. 16 is a diagram showing a flowchart describing the paper fingerprint information registering process according to the present embodiment.

In Step 1601, the CPU 301 controls transmitting the image data of the document read in the scanner unit 13 to the scanner image processing section 312 via the scanner I/F 311. That is, the CPU 301 transmits the R, G, and B signals read in the scanner unit 13 to the scanner image processing section 312.

In Step 1602, the scanner image processing section 312 performs a processing shown in FIG. 5 on this image data, after setting a normal gain adjustment value (gain adjustment value for image data; a first gain adjustment value) to the shading correcting section 500. Thereby, the attribute data is generated as well as new image data. Also, this attribute data is attached to the image data. That is, the scanner image processing section 312 performs a gain adjustment using the first gain adjustment value for the R, G, and B signals.

Further, the scanner image processing section 312 sets a gain adjustment value smaller than the normal gain adjustment value (gain adjustment value for paper fingerprint acquisition; a second gain adjustment value) to the shading correcting section 500. Then, the scanner image processing section 500 outputs each luminance signal value to the paper fingerprint information acquiring section 507, which luminance signal value is obtained by application of the second gain adjustment value for the signal of one color duplicated from one of the R, G, and B signals, among the R, G, and B signals. Then, on the basis of the output signal, the paper fingerprint information acquiring section 507 acquires the paper fingerprint information and transmits the acquired paper fingerprint information to the RAM 302 via the data bus (not shown in the drawing). When the processing in Step 1602 finished, processing in Step 1608 and processing in Step 1603 start at the same time.

In Step 1608, the CPU 301 controls generating the encoded image by encoding the paper fingerprint information, and transmitting the generated encoded image data to the encoded-image combining section 607 in the printer image processing section 315.

In Step 1603, the compression section 313 divides the new image data generated in the scanner image processing section 312 into blocks of 32 pixels by 32 pixels to generate the tile data. Further, the compression section 313 compresses the image data made of multiple blocks of the tile data.

In Step 1604, the CPU 301 controls transmitting the image data compressed in the compression section 313 to the RAM 302 to be stored. Here, this image data is transmitted again to the RAM 302 to be stored, after the image data is transmitted to the image converting section 317 and subjected to an image processing, as needed.

In Step 1605, the CPU 301 controls transmitting the image data stored in the RAM 302 to the expansion section 316. Further, in this step, the expansion section 316 expands this image data and develops the image data made of multiple blocks of tile data after expansion into a raster mode. The image data after the raster development is transmitted to the printer image processing section 315.

In Step 1606, the printer image processing section 315 performs image data edition according to the attribute data attached to the image data. This process is shown in FIG. 6. In this step, the encoded image data generated in Step 1608 and the image data (of the document) are combined. Precisely, the image data (of the document) output from the output-side gamma correcting section 605 and the encoded image data generated in Step 1608 are combined by the encoded-image combining section 607. Then, the half-tone correcting section 606 performs the half-tone processing for the combined image data obtained in the above combining process according to the number of tones in the printer unit for output. The combined image data after the half tone processing is transmitted to the printer unit 14 via the printer I/F 314.

In Step 1607, the printer unit 14 forms an image of the combined image data onto a sheet to be output.

<Operation when the Paper Fingerprint Information Collating Process Tab is Pressed>

Figure 17:
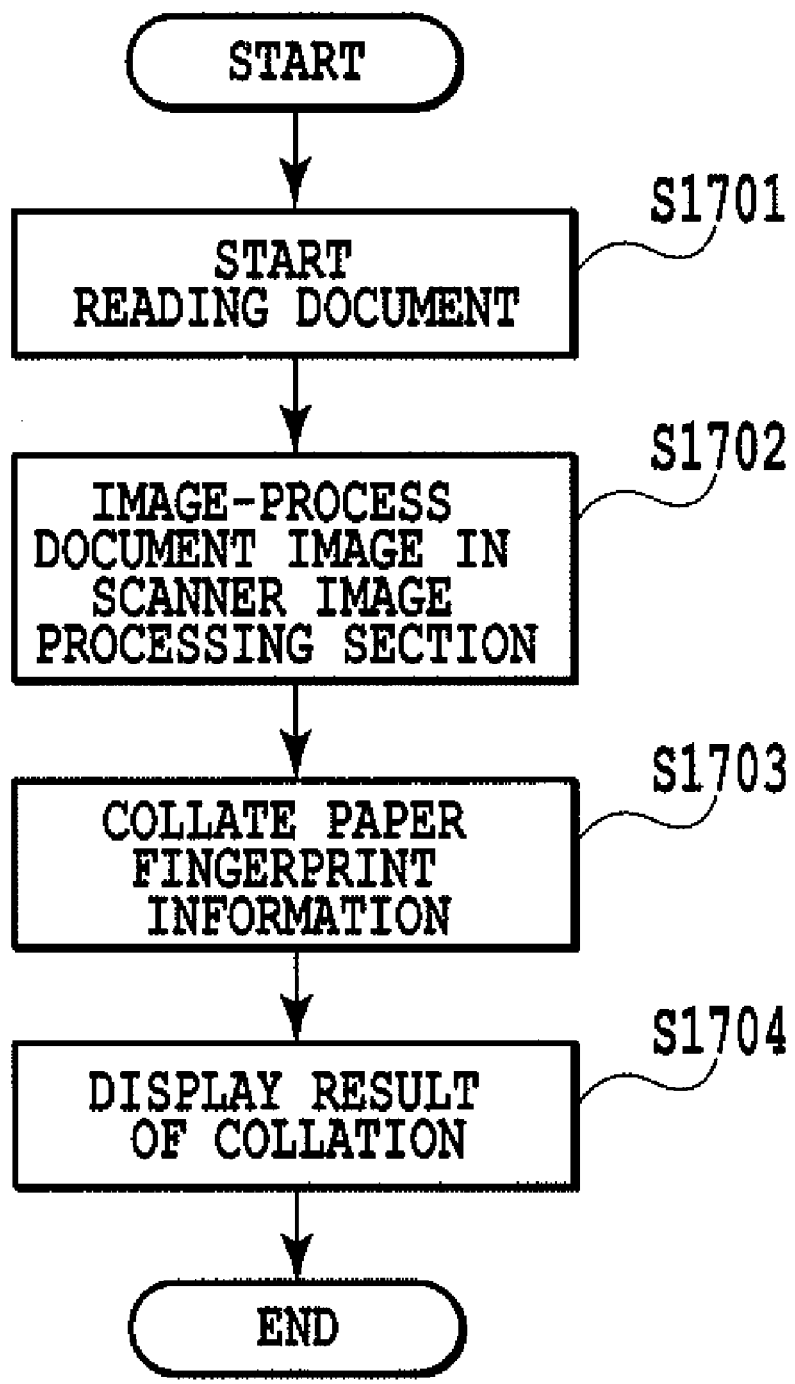
FIG. 17 is a diagram showing a flowchart illustrating a paper fingerprint collating process according to an embodiment of the present invention.

Subsequently, there will be described an operation when the start key is pressed after the paper fingerprint information collating process key 709 shown in FIG. 7 is pressed by a user, with reference to FIG. 17.

In Step 1701, the CPU 301 controls transmitting the image data of the document read in the scanner unit 13 to the scanner image processing section 312 via the scanner I/F 311.

In Step 1702, the scanner image processing section 312 performs a processing shown in FIG. 5 for this image data, and generates the attribute data as well as the new image data and attaches this attribute data to the image data.

Further, in this Step 1702, the paper fingerprint information acquiring section 507 in the scanner image processing section 312 acquires the paper fingerprint information (the configuration for acquiring the paper fingerprint information such as the gain adjustment in the shading correcting section 500 is as described hereinabove). Then, the acquired paper fingerprint information is transmitted to the RAM 302 via the data bus (not shown in the drawing).

Further, in this Step 1702, when there exists an encoded image, the decoder section 508 in the scanner image processing section 312 acquires information by decoding the encoded image. Then the acquired information is transmitted to the RAM 302 via the data bus (not shown in the drawing).

In Step 1703, the CPU 301 performs the paper fingerprint information collating processing. This paper fingerprint information collating processing is as described in <paper fingerprint information collating process> with reference to FIG. 9.

In Step 1704, the CPU 301 controls displaying the result obtained from <paper fingerprint information collating process> (valid or invalid) on the display screen of the operation unit 12.

As described hereinabove, the present embodiment provides a method for extracting a paper fingerprint precisely by utilizing a reading apparatus of a generally used multi-functional copying machine. According to the method, it is not necessary to read twice by changing a light intensity or gain and thereby it is possible to avoid a problem of deterioration in scan productivity. Also, while the same document, once transferred, can not be read again in a case of using a scanner which reads a document during transferring in such a manner as skimming it, the present method enables paper fingerprint to be extracted in a single reading operation. In this manner, it is possible to extract a paper fingerprint by a single scanning not depending on an apparatus configuration and thereby to improve convenience for users.

Furthermore, the present configuration does not need a reading part dedicated to a paper fingerprint, for example, four line sensors (three channels+one channel dedicated to a paper fingerprint), and may need a change only in a signal processing circuit to be realized inexpensively.

(Second Embodiment)

Depending on a circuit configuration of the apparatus, there is a case in which each color signal and one predetermined signal among the color signals can not be transmitted to the controller unit 11 at the same time as in the first embodiment. Then, in the present embodiment, each color signal such as R, G, or B regarding a document image and the above mentioned one signal are transmitted to the controller unit 11 at different timings. That is, the one channel signal duplicated from one of the R, G, and B channel signals is once stored in a memory and transmitted at a predetermined timing after the R, G, and B channel signals have been transmitted.

That is, when four channel signals can not be transmitted to the controller unit from the scanner unit at the same time, an image signal (R, G, and B signals) may be transmitted as a first page signal, and subsequently a paper fingerprint signal (one channel signal duplicated from one of the R, G, and B channel signal) may be transmitted as a second page signal. At this time, for storing the paper fingerprint signal, a page memory of one channel is necessary. Here, transmitting the image signal first allows a position of the paper fingerprint to be specified in advance. On the basis of the specified position information, a paper fingerprint area is cut out on the memory and only paper fingerprint information of the necessary area is transmitted. A smaller image size is preferable from the stand point of transmission efficiency, when paper fingerprint recognizing processing is performed outside the controller unit.

Figure 14:
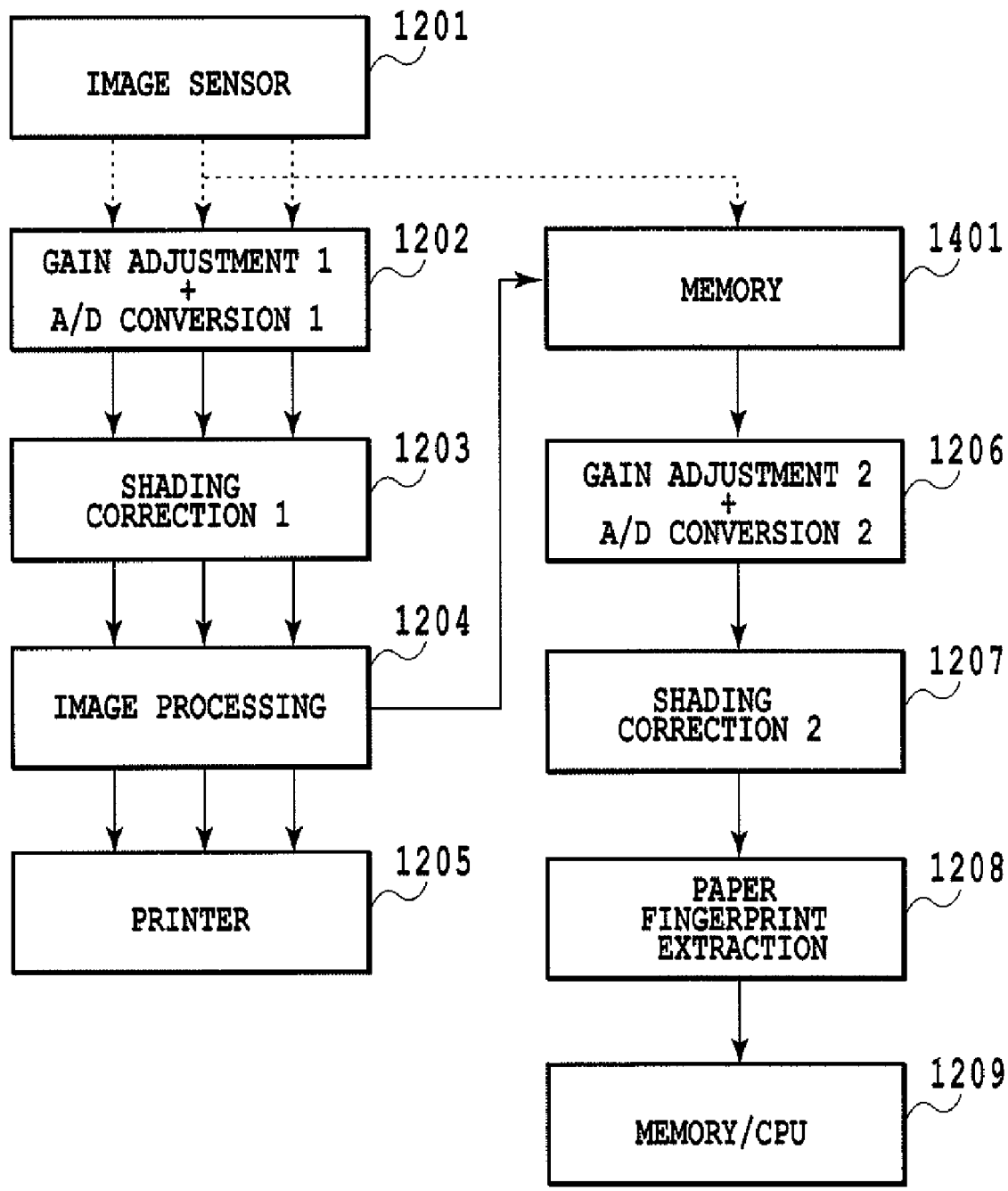
FIG. 14 is an explanatory diagram of a paper fingerprint extracting process according to an embodiment of the present invention.

FIG. 14 is a diagram specifically illustrating an image data processing and a paper fingerprint acquiring processing according to the present embodiment. The configuration of FIG. 14, while basically the same as the configuration of FIG. 12, newly includes a memory 1401 which is a page memory of one channel. The memory 1401 is provided in the scanner unit 13.

That is, the G channel signal among the R, G, and B channel signals output from the image sensor 1201 is duplicated and the duplicated G channel signal (paper fingerprint signal) is once stored in the memory 1401. Meanwhile, the R, G, and B channel signals are input into the gain adjustment 1+A/D-converting 1 section 1202 as an image signal. The image signal is subjected to the gain adjustment by use of the gain adjustment value for the image data in the gain-adjusting 1+A/D-converting 1 section 1202, and subjected to the shading correction in the shading correcting section 1203, to be input into the image processing section 1204.

In the present embodiment, the image processing section 1204 performs a predetermined processing and also specifies a position to be extracted for the paper fingerprint (paper fingerprint position) in the input image. That is, the image processing section 1204 specifies the paper fingerprint position and calculates coordinates of an area to be extracted for the paper fingerprint, on the basis of the R, G, and B channel signals as the image signal. Meanwhile, as this paper fingerprint position, the position where a fabric pattern in the document is read easily is desirable. Concretely, the blank area where a print on the document paper have not been performed (toner or ink is not adhered) is suitable. Here, this blank area indicates a pixel value near the maximum value, i.e. "255" (8 bit), of each signals of RGB. After calculated the coordinates of the extraction area for the paper fingerprint, the image processing section 1204 transmits the coordinates to the memory 1401.

On the basis of the coordinates transmitted from the image processing section 1204, a CPU of the scanner unit 13 cut a signal of an area corresponding to the coordinates out of the paper fingerprint signal (G channel signal) stored in the memory 1401. That is, an area corresponding to the extraction area for the paper fingerprint specified by the image signal is extracted. Next, the CPU of the scanner unit 13 outputs a signal regarding the extracted area to the gain adjustment 2+A/D-converting 2 section 1206. Subsequently, the paper fingerprint is extracted in the gain adjustment 2+A/D-converting 2 section 1206 to the paper fingerprint extracting section 1208 as same as in the first embodiment.

In the present embodiment, among four channel signals, three channels corresponding to the image signal are transmitted first. Then, based on the analyzed result of the signal values, only a signal for a specific area is cut out of the remaining one channel image signal, and transmitted to the controller unit 11. Since this specific area is specified as a paper fingerprint position, one channel signal for paper fingerprint acquisition input into the controller unit 11 comes to include only information regarding the paper fingerprint position. Therefore, it is possible to reduce a data size of the paper fingerprint information to be transmitted. That is, it is possible to reduce a signal amount to be transmitted to the controller unit 11 into an amount required for acquiring the paper fingerprint.

Also, in the present embodiment, the one channel signal for paper fingerprint acquisition does not need a processing for specifying the paper fingerprint, and thereby can save a memory or a hardware configuration for that purpose. In particular, when paper fingerprint analyzing processing is performed not inside the controller unit 11, and, for example, on an external board, to which data is transmitted via USB or the like, there is an advantage of reducing data to be transmitted.

Furthermore, in the present embodiment, the paper fingerprint signal is stored once in the memory of the scanner unit 13 and transmitted after the image signal has been transmitted. Thereby, it is possible to use a normal setting in an I/F protocol or a data bus width to improve convenience for users.

(Third Embodiment)

As described in the second embodiment, there are provided various advantages to provide a memory for storing the paper fingerprint signal once, to calculate a paper fingerprint position from the image signal, and to transmit only an area regarding the position of the paper fingerprint signal. That is, it is possible to reduce necessary hardware and to use a normal bus, resulting in improving convenience for users. Considering such convenience for users, a configuration as shown in FIG. 15 may be used preferably.

Figure 15:
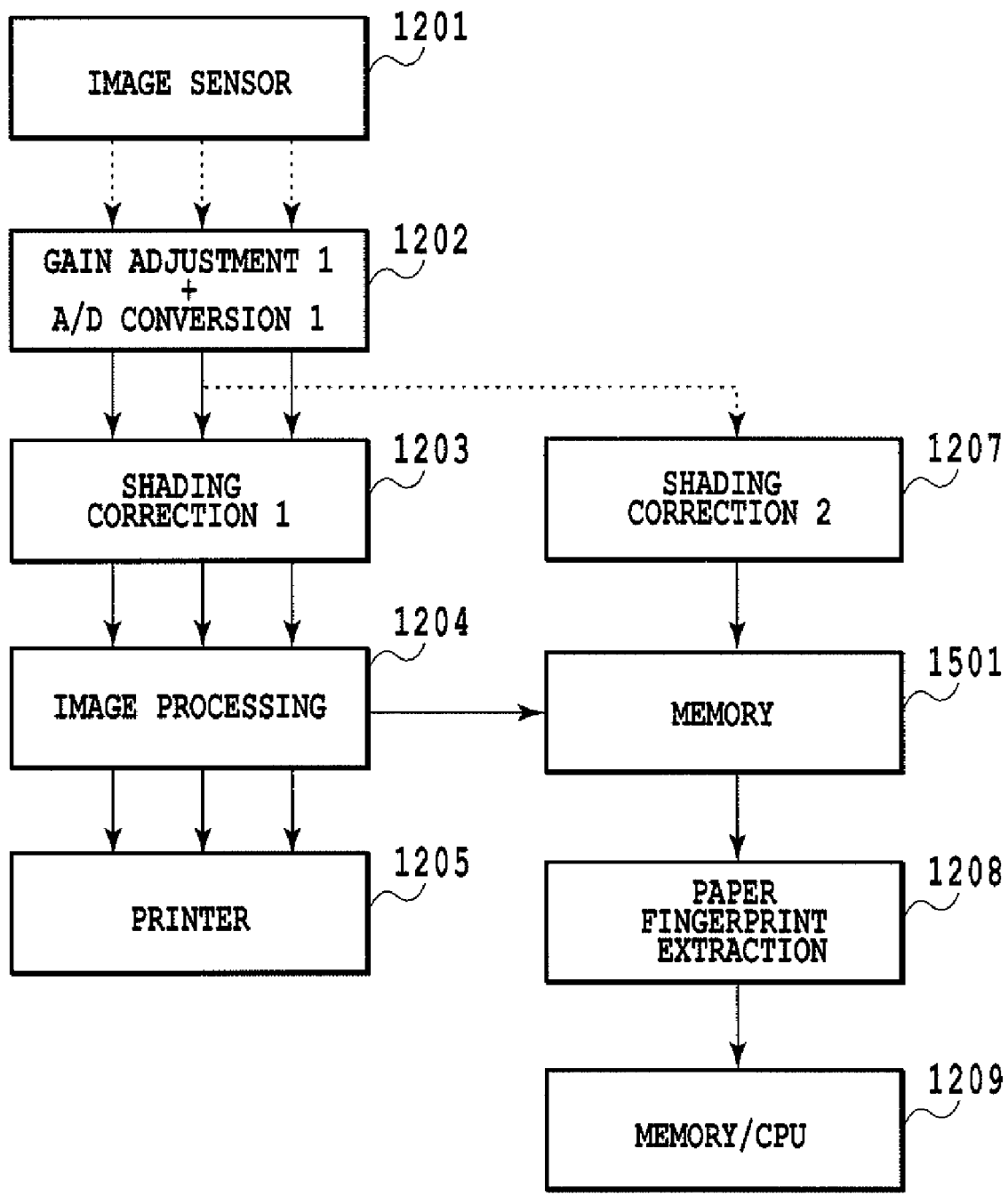
FIG. 15 is an explanatory diagram of a paper fingerprint extracting process according to an embodiment of the present invention.

FIG. 15 is a diagram specifically illustrating an image data processing and a paper fingerprint acquiring processing according to the present embodiment. The configuration of FIG. 15, while basically the same as the configuration of FIG. 12, newly provides a memory 1501 for a one channel page memory between the shading correcting section 1207 and the paper fingerprint extracting section 1208, omitting the gain adjustment 2+A/D-converting 2 section 1206.

In FIG. 15, the R, G, and B channel signals of the image signal output from the image sensor 1201 are input into the gain adjustment 1+A/D-converting 1 section 1202 without signal duplication. Here, this image signal is a signal representing a light intensity within an allowable range.

Figure 18:
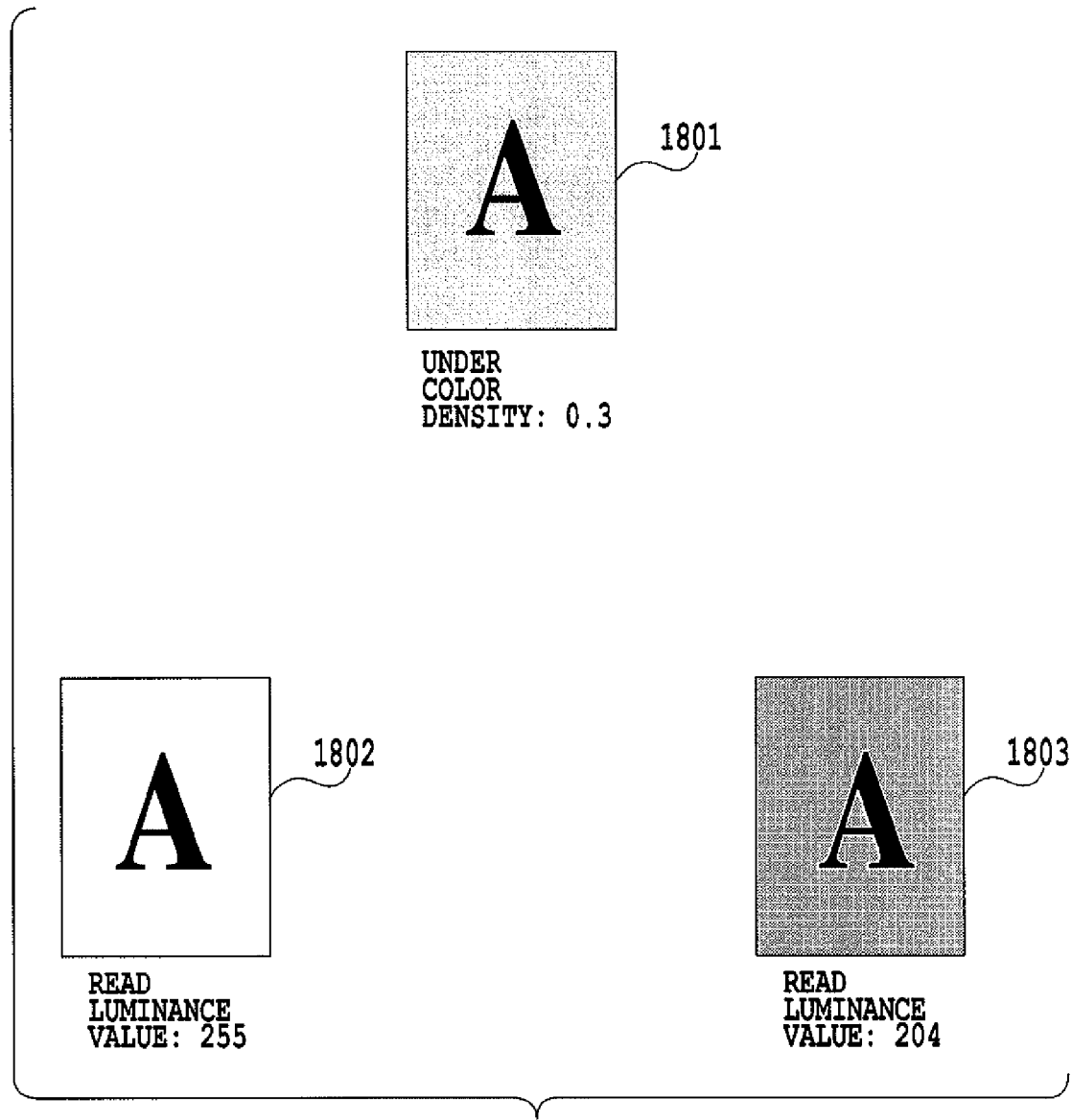
FIG. 18 is a diagram for illustrating a light intensity allowing image processing and paper fingerprint acquisition to be performed according to an embodiment of the present invention.

FIG. 18 shows an example. A document 1801 has a background color with a density of 0.3. When this is read for image processing and the read image signal has a luminance signal value of 255 (in a case of eight bits) (1802), the background color of a paper becomes completely white and a paper fingerprint can not be read. Then, the document is read by changing a gain in order to read the paper fingerprint. For example, the document 1801 to be read at a luminance signal value of 255 is read at a luminance signal value of 204 reduced by 20% (1803). Thereby, the background color may be reproduced sufficiently for the paper fingerprint to be extracted.

Figure 19:
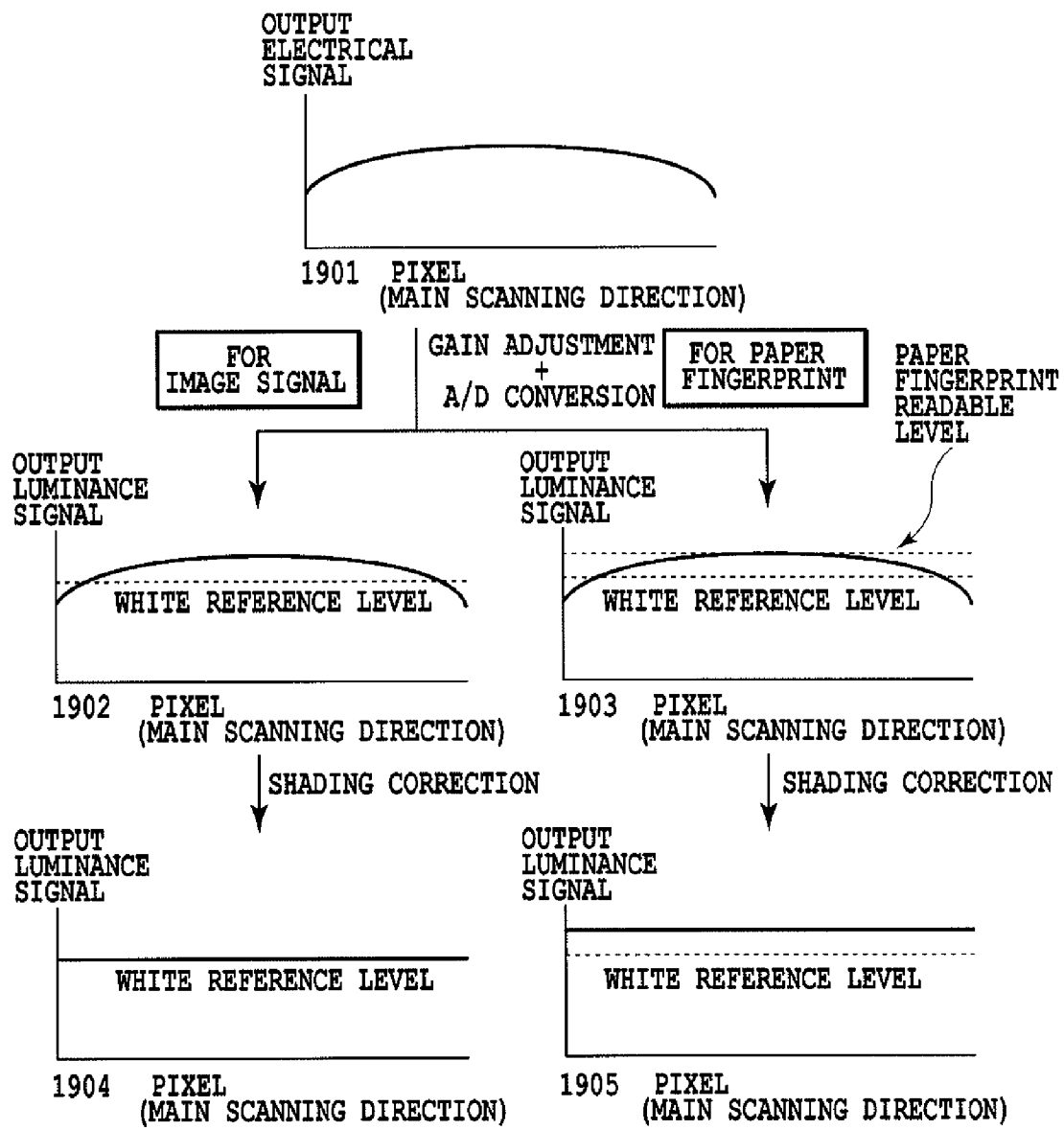
FIG. 19 is an explanatory diagram of processing in a shading correcting section 1203 and a shading correcting section 1207 according to an embodiment of the present invention.

Processing performed at this time in the shading correcting section 1 (1203) and the shading correcting section 2 (1207) shown in FIG. 15 will be illustrated in FIG. 19.

An image signal 1901 for paper fingerprint is gain-adjusted to a level sufficient for the paper fingerprint to be read. Then, a shading correction for a paper fingerprint 1903 is performed to obtain a paper fingerprint signal 1905. The obtained signal has a higher level (brighter) than an original white reference level.

Meanwhile, an image signal 1902 for an image signal is subjected to a shading correction of multiplying by 10/8 in a shading correction 1902 for compensating the gain adjustment of 20%, to become an image signal 1904. The obtained signal is a signal based on the original white reference level.

For explanation, as an example the background color density of 0.3 of the document is read as the level of 255 in the luminance signal with eight bits, but the present embodiment is not limited to this case.

The G channel signal is duplicated among the R, G, and B channel signals subjected to the gain adjustment with a normal gain adjustment value in the gain adjustment 1+A/D-converting 1 section 1202. That is, in the circuit configuration, the R, G, and B channel signals as the image signal are output to the shading correcting section 1203 and the duplicated G channel signal as the paper fingerprint signal is output to the shading correcting section 1207.

The paper fingerprint signal that is the above duplicated signal is subjected to the shading correction in the shading correcting section 1207 and stored once in the memory 1501.

The image processing section 1204 specifies a paper fingerprint position based on the image signal as same as in the second embodiment, and calculates coordinates of an area to be extracted as the paper fingerprint. After calculated the coordinates of the extraction area of the paper fingerprint, the image processing section 1204 transmits the coordinates to the memory 1501.

Subsequently, the CPU 301 extracts an area corresponding to the paper fingerprint extraction area specified by the image signal from the paper fingerprint signal (G channel signal) stored in the memory 1501 based on the coordinates transmitted from the image processing section 1204. Next, the CPU 301 outputs a signal regarding the extracted area to the paper fingerprint extracting section 1208. Then, the paper fingerprint extracting section 1208 extracts the paper fingerprint as same as in the first embodiment.

As described in the second embodiment and the third embodiment, it is useful for improving convenience for users to store the paper fingerprint signal for extracting a paper fingerprint once in a storage unit such as a memory before the paper fingerprint extracting processing. After storing the paper fingerprint signal in this manner, based on an area to be extracted as a paper fingerprint calculated from the image signal, only a signal regarding the area is acquired from the paper fingerprint signal stored in the storage unit. Thereby, it is possible to reduce a signal amount to a size to be required for acquiring a paper fingerprint.

(Fourth Embodiment)

Although only one color signal is duplicated for acquiring a paper fingerprint in the first to third embodiments, one or more color signals, not limited to one, maybe duplicated. In the present invention, if there is a signal of one color for acquiring a paper fingerprint, paper fingerprint information, though the information is only gray scale information, can be acquired, and it is preferable to use only one signal duplicated for acquiring a paper fingerprint, considering a reduction of a circuit configuration or cost thereof.

An important aspect of the present invention, however, is to carry out acquisitions of a paper fingerprint and an image at the same time, to duplicate a signal(s) from among R, G, and B channel signals read by a scanner, and to acquire the paper fingerprint from the duplicated signal(s). Therefore, if there are one or more duplicated color signals, the processing described in the first to third embodiments is performed on each of the one or more duplicated color signals, and the object of the present invention may be achieved.

(Fifth Embodiment)

In the first to fourth embodiments, the duplication of a signal for paper fingerprint acquisition is realized by the circuit configurations such as duplicating the signal. This is because an image signal and a paper fingerprint signal are intended to be acquired from R, G, and B signals regarding an image read by a single scanning. The acquisition in this manner may be realized in one embodiment of the present invention.

Accordingly, in the present embodiment, a signal storing unit such as a memory may be provided between the image sensor and the gain adjustment 1+A/D-converting 1 section 1202 and the gain adjustment 2+A/D-converting 2 section 1206 in FIG. 12, for example. That is, R, G, and B signals regarding an image read by scanning may be stored once in the signal storing unit. In this case, the signal storing unit outputs the R, G, and B channel signals as an image signal to the gain adjustment 1+A/D-converting 1 section 1202. At the same time, the signal storing unit outputs the G channel signal as a paper fingerprint signal to the gain adjustment 2+A/D-converting 2 section 1206. In this manner, the signal storing unit is provided, and thereby the R, G, and B signals regarding the image read by a single scanning are divided into the image signal and the paper fingerprint signal. That is, the paper fingerprint signal is acquired from the R, G, and B signals regarding the image read by a single scanning, separately from the R, G, and B signals.

(Sixth Embodiment)

Although, an embodiment in which the above described characteristic processing of the present invention is performed by the image forming apparatus, has been shown in the first to fifth embodiments, the processing may be performed by a computer such as a PC connected to the image forming apparatus 10 via a network, for example.

In the present embodiment, a PC may be configured such that the PC performs each function of the sections in the controller unit 11 such as the gain adjustment 1+A/D-converting 1 section 1202 and the gain adjustment 2+A/D-converting 2 section 1206, the shading correcting sections 1203 and 1207, image processing section 1204, and the paper fingerprint extracting section 1208. Also, in this case, the PC is provided with a signal storing unit described in the fifth embodiment. In such a configuration, the PC acquires multiple color signals read by a scanner or the like from the scanner or the like connected to a network. Also, the PC can acquire the multiple color signals by reading from a portable storage medium like a CD.

In this configuration, R, G, and B channel signals acquired by the image sensor 1201 are input into the PC via the network and stored once in the signal storing unit. Then, the R, G, and B channel signals are output as an image signal from the signal storing unit to the gain adjustment 1+A/D-converting 1 section 1202. At the same time, the G channel signal is output as a paper fingerprint signal from the signal storing unit to the gain adjustment 2+A/D-converting 2 section 1206. After that, a paper fingerprint is acquired by the method described in each of the above described embodiments.

Other Embodiments

Further, the present invention can be applied to a system constituted by a plurality of apparatuses (e.g., computer, interface equipment, reader, printer and the like), and also to an apparatus constituted by a single equipment (multi-functional apparatus, printer, facsimile or the like).

A processing method, storing a program that operates the above-described configurations of the embodiments in order to realize the above-described functions of the embodiments in a storage medium, reading out the program stored in the storage medium as a code, and executing the code in a computer, falls within the scope of the foregoing embodiments. Also, the above-described computer program itself as well as the storage medium storing the computer program falls within the scope of the foregoing embodiments.

The storage medium includes, for example, a floppy disk (registered trademark), a hard disk, an optical disk, a magneto-optical disk, a CD-ROM, a magnetic tape, a non-volatile memory card, and a ROM.

Not limited to a system executing the processing using only a program stored in the above mentioned storage medium, a system that operates on an OS, in conjunction with other software and functions of an extension board, to execute the operations of the foregoing embodiments, falls within the scope of the above mentioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-166960, filed Jun. 25, 2007, which is hereby incorporated by reference herein in its entirety.

What is claimed is:

1. An image processing apparatus comprising:
    means for acquiring multiple color signals according to a document obtained by scanning;
    first gain adjustment means for performing gain adjustment on said multiple color signals;
    second gain adjustment means for performing gain adjustment, which is different from the gain adjustment performed on said multiple color signals, on at least one color signal and not on all said multiple color signals; and
    extraction means for extracting paper fingerprint information of said document using a color signal on which gain adjustment by said second gain adjustment means is performed.

2. The image processing apparatus according to claim 1, wherein:
    said first gain adjustment means performs gain adjustment on said multiple color signals using a first gain adjustment value; and
    said second gain adjustment means performs gain adjustment on said at least one color signal using a second gain adjustment value smaller than said first gain adjustment value.

3. The image processing apparatus according to claim 1, further comprising:
    storage means for storing said at least one color signal, before said at least one color signal is input into said second gain adjustment means.

4. The image processing apparatus according to claim 3, further comprising:
    means for calculating coordinates of a predetermined area in said document based on the multiple color signals; and
    means for extracting a signal relating to an area corresponding to said predetermined area from said at least one color signal stored in said storage means based on said calculated coordinates;
    wherein said second gain adjustment means performs gain adjustment on said extracted signal.

5. The image processing apparatus according to claim 1, wherein said at least one color signal is acquired by separating said at least one color signal from said acquired multiple color signals.

6. The image processing apparatus according to claim 1, further comprising:
    signal storing means for storing said multiple color signals; and
    means for storing said multiple color signals acquired by said means for acquiring multiple color signals in said signal storing means, and outputting said multiple color signals and at least one color signal among the multiple color signals from the signal storing means.

7. The image processing apparatus according to claim 1, further comprising means for removing a background color of the document in said multiple color signals.

8. An image processing apparatus comprising:
    means for acquiring multiple color signals according to a document obtained by scanning;
    storage means for storing at least one color signal out of the multiple color signals;

first gain adjustment means for adjusting at least a first gain of the multiple color signals;

means for calculating coordinates of a predetermined area in a document image of the multiple color signals based on the gain adjusted multiple color signals;

means for extracting a signal regarding an area corresponding to the predetermined area from the at least one color signal stored in the storage means based on the calculated coordinates;

second gain adjustment means for adjusting a second gain different from the first gain of the extracted signal; and means for acquiring paper fingerprint information of the document based on the extracted signal in which the second gain was adjused by the second gain adjusting means.

9. An image processing method comprising:

a step of acquiring multiple color signals according to a document obtained by scanning;

a first gain adjustment step of performing gain adjustment on said multiple color signals;

a second gain adjustment step of performing gain adjustment, which is different from the gain adjustment performed on said multiple color signals, on at least one color signal and not on all said multiple color signals; and a step of extracting paper fingerprint information of said document using a color signal on which gain adjustment is performed in said second gain adjustment step.

10. The image processing method according to claim 9, wherein:

said first gain adjustment step performs gain adjustment on said multiple color signals using a first gain adjustment value, and said second gain adjustment step performs gain adjustment on said at least one color signal using a second gain adjustment value smaller than said first gain adjustment value.

11. The image processing method according to claim 9, further comprising a step of storing said at least one color signal into a storage means, before said second gain adjustment step.

12. The image processing method according to claim 11, further comprising the steps of:

calculating coordinates of a predetermined area in said document based on the multiple color signals before said second gain adjustment step; and extracting a signal relating to an area corresponding to said predetermined area from said at least one color signal stored in said storage means based on said calculated coordinates before said second gain adjustment step;

wherein said second gain adjustment step performs gain adjustment on said extracted signal.

13. The image processing method according to claim 9, further comprising a step of removing a background color of the document in said multiple color signals.

14. A program stored in a non-transitory computer readable storage medium for causing a computer to perform the image processing method according to claim 9.

15. An image processing method comprising the steps of:

acquiring multiple color signals according to a document obtained by scanning;

storing at least one color signal out of the multiple color signals into a storage means;

adjusting at least a first gain of the multiple color signals;

calculating coordinates of a predetermined area in a document image of the multiple color signals based on the gain adjusted multiple color signals;

extracting a signal regarding an area corresponding to the predetermined area from the at least one color signal stored in the storage means based on said calculated coordinates;

adjusting a second gain different from the first gain of the extracted signal; and acquiring paper fingerprint information of the document based on the extracted signal in which the second gain was adjusted.

* * * * *